(12) United States Patent
Koshitouge et al.

(10) Patent No.: US 12,291,007 B2
(45) Date of Patent: ***May 6, 2025

(54) COMPOSITION FOR SOUND INSULATING SHEET MEMBER, SOUND INSULATING SHEET MEMBER, AND SOUND INSULATING STRUCTURE BODY

(71) Applicant: Mitsubishi Chemical Corporation, Tokyo (JP)

(72) Inventors: Haruki Koshitouge, Tokyo (JP); Daichi Okuno, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,508

(22) Filed: Oct. 16, 2023

(65) Prior Publication Data

US 2024/0042742 A1 Feb. 8, 2024

Related U.S. Application Data

(63) Continuation of application No. 17/078,272, filed on Oct. 23, 2020, now Pat. No. 11,931,990, which is a (Continued)

(30) Foreign Application Priority Data

Apr. 27, 2018 (JP) .................. 2018-087370
Apr. 27, 2018 (JP) .................. 2018-087374

(51) Int. Cl.
  B32B 25/08 (2006.01)
  B32B 3/30 (2006.01)
  (Continued)

(52) U.S. Cl.
  CPC ............. B32B 25/08 (2013.01); B32B 3/30 (2013.01); E04B 1/8409 (2013.01); E04B 1/86 (2013.01);
  (Continued)

(58) Field of Classification Search
  CPC ....... B32B 25/08; B32B 3/30; B32B 2250/02; B32B 2307/102; B32B 2319/00;
  (Continued)

(56) References Cited

U.S. PATENT DOCUMENTS 8,974,336 B2  3/2015  Nakashima
11,931,990 B2 * 3/2024  Koshitouge .............. B32B 3/30
  (Continued)

FOREIGN PATENT DOCUMENTS

CN  103064251 A  4/2013
CN  106554158 A  4/2017
  (Continued)

OTHER PUBLICATIONS

Office Action and Search Report issued Sep. 4, 2023, in corresponding Chinese Patent Application No. 201980028255.X (with English Machine Translation).
(Continued)

*Primary Examiner* — Forrest M Phillips
(74) *Attorney, Agent, or Firm* — Oblon, McClelland, Maier & Neustadt, L.L.P.

(57) ABSTRACT

A structural body including a plurality of convex-shaped rubber-elastic resonant portions, and a sheet-like support that supports the resonant portions. A specific gravity of the resonant portions is 1.0 g/cm³ or more and 3.0 g/cm³ or less, a height of the resonant portions is from 50 μm to 100 mm, and an areal density of the support is 1.0 kg/m² or less.

20 Claims, 13 Drawing Sheets

Related U.S. Application Data continuation of application No. PCT/JP2019/017777, filed on Apr. 25, 2019.

(51) Int. Cl.
*E04B 1/84* (2006.01)
*E04B 1/86* (2006.01)

(52) U.S. Cl.
CPC ..... *B32B 2250/02* (2013.01); *B32B 2307/102* (2013.01); *B32B 2307/3065* (2013.01); *B32B 2319/00* (2013.01); *E04B 2001/8419* (2013.01); *E04B 2001/8428* (2013.01)

(58) Field of Classification Search
CPC .. E04B 1/8409; E04B 1/86; E04B 2001/8419; E04B 2001/8428
See application file for complete search history.

(56) References Cited

U.S. PATENT DOCUMENTS

| | | | |
|---|---|---|---|
| 2006/0131103 A1* | 6/2006 | Fuller | ............ E04B 1/7604 181/290 |
| 2014/0234610 A1 | 8/2014 | Iwase | |
| 2014/0272277 A1 | 9/2014 | Schaedler | |
| 2014/0348559 A1 | 11/2014 | Miyahara | |
| 2016/0377139 A1 | 12/2016 | Vito | |
| 2017/0087964 A1 | 3/2017 | Nakamura | |
| 2017/0248809 A1 | 8/2017 | Oba et al. | |
| 2017/0267842 A1 | 9/2017 | Ohkubo et al. | |
| 2018/0340328 A1 | 11/2018 | Koga et al. | |

FOREIGN PATENT DOCUMENTS

| | | | |
|---|---|---|---|
| JP | H05(1993)-287197 | A | 11/1993 |
| JP | 10-312191 | A | 11/1998 |
| JP | 2000-265593 | A | 9/2000 |
| JP | 2005-226382 | A | 8/2005 |
| JP | 2006-283847 | A | 10/2006 |
| JP | 2013-116589 | A | 6/2013 |
| JP | 2013-231316 | A | 11/2013 |
| JP | 2017-227109 | A | 12/2017 |
| KR | 10-2006-0024834 | A | 3/2006 |
| KR | 20170074907 | A | 6/2017 |
| WO | WO 2016/093339 | A1 | 6/2016 |
| WO | WO 2017/135409 | A1 | 8/2017 |

OTHER PUBLICATIONS

International Search Report issued Jun. 4, 2019 in PCT/JP2019/017777 filed Apr. 25, 2019, 2 pages.
English translation of the International Preliminary Report on Patentability issued on Nov. 5, 2020 in PCT/JP2019/017777, 8 pages.
Extended European Search Report issued Feb. 10, 2022 in European Patent Application No. 19791506.9, 8 pages.
Chinese Decision of Rejection dated Apr. 4, 2024 in Chinese Patent Application No. 201980028255.X (with unedited computer-generated English Translation), 15 pages.
European Office Action issued Oct. 13, 2023 in European Application 19791506.9, 6 pages.
Combined Chinese Office Action and Search Report issued on Jan. 31, 2024 in Chinese Patent Application No. 201980028255.X (with English machine translation), 17 pages.
"Plastic resin brand application Manual", Shanghai science and technology Press, 1992, 7 pages (with English machine translation).

* cited by examiner

COMPOSITION FOR SOUND INSULATING SHEET MEMBER, SOUND INSULATING SHEET MEMBER, AND SOUND INSULATING STRUCTURE BODY

CROSS-REFERENCE TO RELATED APPLICATION

The present disclosure is a continuation of U.S. application Ser. No. 17/078,272, filed on Oct. 23, 2020, which is a continuation of International Application PCT/JP2019/017777, filed on Apr. 25, 2019, and designated the U.S., and claims priority from Japanese Patent Application 2018-087374 which was filed on Apr. 27, 2018, and Japanese Patent Application 2018-087370 which was filed on Apr. 27, 2018, the entire contents of each are incorporated herein by reference.

TECHNICAL FIELD

The present invention relates to a composition fora sound insulating sheet member, a sound insulating sheet member, and a sound insulating structure body.

BACKGROUND ART

Buildings such as housing complexes, office buildings, and hotels need to be quiet suitable for room use by insulating outdoor noise from automobiles, trains, airplanes, and ships, or the like as well as facility noise and human noise generated inside the building. In vehicles such as automobiles, trains, airplanes, and ships, indoor noise needs to be reduced by insulating wind and engine noise to provide a quiet and comfortable space for passengers. Therefore, research and development of means of insulating transmission of noise or vibration from outside to inside of a room or from outside to inside of a vehicle, or sound insulating means has been carried out. In recent years, in order to increase the height of buildings and the energy efficiency of vehicles, as well as to improve the design flexibility of buildings, vehicles and their facilities, sound insulating members applicable to complex shapes are being demanded.

Conventionally, the structure of sound insulating members, especially sheet-like members, has been improved in order to improve sound insulating performance. For example, a method of using a plurality of rigid flat plate materials such as gypsum board, concrete, steel plate, glass plate, or resin plate in combination (Patent Document 1), a method of creating a hollow double or triple wall structure using gypsum board, or the like (Patent Document 2), a method of combining a flat plate material with a plurality of independent stump-like protrusions (Patent Documents 3 and 4), and the like are known.

CITATION LIST

Patent Documents

Patent Document 1 JP 2013-231316 A
Patent Document 2 JP 2017-227109 A
Patent Document 3 JP 2000-265593 A
Patent Document 4 WO 2017/135409

SUMMARY OF INVENTION

Technical Problem

In the above-described Patent Documents 1 to 4, improvements have been made to the sound insulating members in order to improve the sound insulating performance from the viewpoint of the structure of the members. However, there is a problem that improvements have not been sufficiently made from the viewpoint of the materials of the members, especially from the viewpoint of the properties of the materials.

The present invention is aimed at providing a composition for a sound insulating sheet member, a sound insulating sheet member, and a sound insulating structure body with excellent sound insulating performance.

Solution to Problem

The present inventors intensively studied to solve the above-described problem to find that the above-described problem can be solved by setting the storage modulus obtained from the composite curve of the dynamic viscoelasticity of a resonant portion within a specified range and by setting the areal density of a support within a predetermined range, thereby completing the present invention.

The present inventors intensively studied to solve the above-described problem to find that the above-described problem can also be solved by setting the storage modulus obtained from the composite curve of the dynamic viscoelasticity of a sound insulating sheet member within a specified range, thereby completing the present invention.

Furthermore, the present inventors found that the above-described problem can also be solved by providing a composition for obtaining a cured product in which the peak temperature of the loss factor (tan δ) obtained by dynamic viscoelasticity measurement is within a specified range, and a sound insulating sheet member obtained by curing the composition, thereby completing the present invention.

Specifically, the present invention is as follows.

(A1) A sound insulating structure body including: a plurality of convex-shaped rubber-elastic resonant portions; and a sheet-like support that supports the resonant portions, wherein
   the resonant portions have a storage modulus G' obtained from a composite curve of dynamic viscoelasticity according to ISO 6721-4 of 100 MPa or less at 25° C. and 10 kHz, and
   the areal density of the support is 1.0 kg/m² or less.

(A2) The sound insulating structure body according to (A1), including a sound insulating sheet member including the resonant portions and a rubber-elastic sheet portion on which the resonant portions are provided, wherein
   the sound insulating sheet member is layered on the support.

(A3) The sound insulating structure body according to (A2), wherein the sound insulating sheet member is integrally molded.

(A4) The sound insulating structure body according to any one of (A1) to (A3), wherein the resonant portions have a storage modulus G' obtained from a composite curve of dynamic viscoelasticity according to ISO 6721-4 of 1 MPa or more at 25° C. and 10 kHz.

(A5) The sound insulating structure body according to any one of (A1) to (A4), wherein the resonant portions have a peak temperature of tan δ obtained by dynamic viscoelasticity measurement according to ISO 6721-4 of 20° C. or less at 1 Hz.

(A6) The sound insulating structure body according to any one of (A1) to (A5), wherein the resonant portions have a tensile elongation at break at a tensile speed of 5 mm/min of 30% or more in accordance with ISO 527.

(A7) The sound insulating structure body according to any one of (A1) to (A6), wherein the resonant portions have a storage modulus G' obtained from a composite curve of dynamic viscoelasticity according to ISO 6721-4 of 80 MPa or less at 25° C. and 5 kHz.
(A8) The sound insulating structure body according to any one of (A1) to (A7), wherein the resonant portions include a photo-curable resin.
(A9) The sound insulating structure body according to any one of (A1) to (A8), wherein the specific gravity of the plurality of resonant portions is uniform.
(A10) The sound insulating structure body according to any one of (A1) to (A9), wherein the height of the sound insulating sheet member is from 50 μm to 10 mm.

The present invention also includes the following inventions.
(B1) A rubber-elastic sound insulating sheet member having a storage modulus G' obtained from a composite curve of dynamic viscoelasticity according to ISO 6721-4 of 100 MPa or less at 25° C. and 10 kHz, and having an uneven structure on at least one face of the sound insulating sheet member.
(B2) The sound insulating sheet member according to (B1), including a support on at least one face of the sound insulating sheet member.
(B3) The sound insulating sheet member according to (B1) or (B2), including a photo-curable resin.

Furthermore, the present invention also includes the following inventions.
(C1) A composition for a sound insulating sheet member, wherein
   a cured product thereof has rubber elasticity, and
   the peak temperature of tan δ obtained by dynamic viscoelasticity measurement according to ISO 6721-4 is 20° C. or less at 1 Hz.
(C2) The composition for a sound insulating sheet member according to (C1), including a photo-curable monomer.
(C3) The composition for a sound insulating sheet member according to (C2), including a constituent unit derived from a bifunctional monomer (component (A)) and a constituent unit derived from a monofunctional monomer (component (B)) as the photo-curable monomer, and including a radical photopolymerization initiator (component (C)).
(C4) A sound insulating sheet member, including a cured product of the composition for a sound insulating sheet member according to any one of (C1) to (C3).
(C5) The sound insulating sheet member according to (C4), including a support on at least one face of the sound insulating sheet member.
(C6) The sound insulating sheet member according to (C4) or (C5), wherein at least one face of the sound insulating sheet member has an uneven structure.
(C7) A sound insulating sheet member, wherein a cured product of the composition for a sound insulating sheet member according to anyone of (C1) to (C3) is layered on a support that supports the cured product.

Advantageous Effects of Invention

According to the present invention, a composition for a sound insulating sheet member, a sound insulating sheet member, and a sound insulating structure body with excellent sound insulating performance can be provided.

DESCRIPTION OF EMBODIMENTS

The present invention will be described in detail in conformity with Embodiments. However, the present invention is not limited to the Embodiments explicitly or implicitly described herein. As used herein, when "to" is used with numerical or characteristic values before or after it, such values are expressed as being included.

In the present invention, "a plurality of" means "two or more".

The term "sound insulating sheet member" means a member including at least a sheet portion, or a sheet portion, and while in a first embodiment described below, the "sound insulating sheet member" includes not only a sheet portion but also a resonant portion as essential components, in second and third embodiments, the "sound insulating sheet member" includes a sheet portion as an essential component, and a member such as a resonant portion as an optional component. A sound insulating structure body refers to a structure including at least one member selected from a sheet portion, a resonant portion, and a sound insulating sheet member, and a member (for example, a support) other than these members.

As used herein, "(meth)acrylate" is a generic term for acrylate and methacrylate, and means one or both of acrylate and methacrylate, and the same applies to "(meth)acryloyl" and "(meth)acrylic".

Between the embodiments shown below, materials and properties of each member may be employed with each other unless otherwise specified.

Characteristic values of members, such as resonant portions, which can be used in more than one, are calculated as the average of the characteristic values of a plurality of the members, unless otherwise specified.

1. First Embodiment

Figure 1:
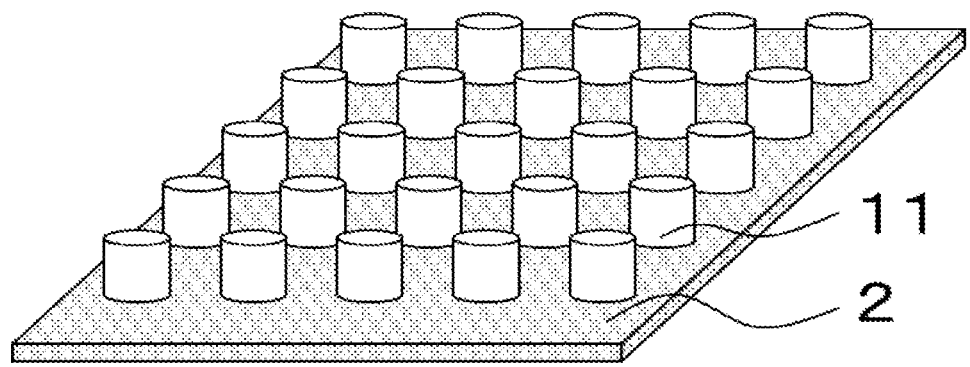
FIG. 1 is a perspective view of a sound insulating structure body, which is one embodiment of the present invention.

A sound insulating structure (hereinafter, also simply referred to as "sound insulating structure body") of a first embodiment of the present invention is a sound insulating structure body including: a plurality of convex-shaped rubber-elastic resonant portions; and a sheet-like support that supports the resonant portions, wherein the resonant portions have a storage modulus G' obtained from a composite curve of dynamic viscoelasticity according to ISO 6721-4 of 100 MPa or less at 25° C. and 10 kHz, and the areal density of the support is 1.0 kg/m² or less. A perspective view of one aspect of the sound insulating sheet is shown in FIG. 1.

<1-1. Resonant Portion>
<1-1-1. Material>

The type of material used for a resonant portion is not particularly limited as long as the dynamic viscoelasticity can be measured, or in other words, as long as the material is rubber-elastic, and, examples thereof include resins and elastomers.

Details of the material of the resonant portion will be described below, and a composition fora sound insulating sheet member described in the third embodiment described below can also be used.

Examples of the resin include a thermosetting or photo-curable resin and a thermoplastic resin, and examples of the elastomer include a thermosetting or photo-curable elastomer and a thermoplastic elastomer, and among these, a photo-curable resin or a photo-curable elastomer is preferable, and, in particular, from the viewpoint of favorable shape transferability and excellent productivity, a photo-curable resin is preferably included. When a thermosetting or thermoplastic resin, or a thermosetting or thermoplastic elastomer is used as the material fora resonant portion, there is a strong tendency for air bubbles to form in a molded resonant portion due to the need for a thermal curing reaction during molding. If air bubbles are generated, resonance becomes difficult to achieve and sound insulating performance is reduced. On the other hand, when a photo-curable resin or photo-curable elastomer is used as the material of a resonant portion, a problem of air bubbles as described above does not occur, and the sound insulating performance is unlikely to be reduced.

Resins and elastomers may be used as materials, either singly or in any combination and ratio of two or more types thereof, and a combination of two or more types of materials is preferable from the viewpoint of being capable of controlling properties such as storage modulus and tensile elongation at break.

Examples of a resin used in a resonant portion include: a thermosetting resin such as an unsaturated polyester resin, a phenolic resin, an epoxy resin, an urethane resin, or a rosin-modified maleic acid resin; a photo-curable resin such as a single polymer or a copolymer of monomers such as epoxy (meth)acrylate, urethane (meth)acrylate, polyester (meth)acrylate, polyether (meth)acrylate, or a modified product thereof; a single polymer or a copolymer of vinyl monomers such as vinyl acetate, vinyl chloride, vinyl alcohol, vinyl butyral, and vinylpyrrolidone; or a thermoplastic resin such as a saturated polyester resin, a polycarbonate resin, a polyamide resin, a polyolefin resin, a polyarylate resin, a polysulfone resin, and a polyphenylene ether resin.

Among these, urethane (meth)acrylate, polyester (meth) acrylate, and polyether (meth)acrylate, which have a low modulus of elasticity in a cured product, are preferable, and urethane (meth)acrylate is particularly preferable.

Examples of an elastomer used in a resonant portion include a thermosetting elastomer such as a thermosetting resin-based elastomer such as a vulcanized rubber such as chemically cross-linked natural or synthetic rubber, urethane rubber, silicone rubber, fluoroelastomer, or acrylic rubber; a thermoplastic elastomer such as an olefin thermoplastic elastomer, a styrene thermoplastic elastomer, a vinyl chloride-based thermoplastic elastomer, a urethane thermoplastic elastomer, an ester thermoplastic elastomer, an amide thermoplastic elastomer, a silicone rubber thermoplastic elastomer, or an acrylic thermoplastic elastomer, a photo-curable elastomer such as an acrylic photo-curable elastomer, a silicone photo-curable elastomer, or an epoxy photo-curable elastomer, a silicone thermosetting elastomer, an acrylic thermosetting elastomer, and an epoxy thermosetting elastomer. Among these, a silicone-based thermosetting elastomer or an acrylic-based thermosetting elastomer, which is a thermosetting elastomer, or an acrylic-based photo-curable elastomer or a silicone-based photo-curable elastomer, which is a photo-curable elastomer, is preferable.

A photo-curable resin is a resin that polymerizes by light irradiation. Examples thereof include a photo-radical polymerizable resin and a photo-cationic polymerizable resin. Among them, a photo-radical polymerizable resin is preferable. A photo-radical polymerizable resin preferably has at least one or more (meth)acryloyl groups within the molecule. A photo-radical polymerizable elastomer having one or more (meth)acryloyl groups within the molecule is not particularly limited, and from the viewpoint of modulus of elasticity of a cured product, examples thereof include methyl(meth)acrylate, ethyl(meth)acrylate, n-propyl(meth)acrylate, i-propyl(meth)acrylate, n-butyl(meth)acrylate, i-butyl(meth)acrylate, t-butyl (meth)acrylate, 2-methylbutyl (meth)acrylate, n-pentyl(meth)acrylate, n-hexyl(meth)acrylate, n-heptyl(meth)acrylate, 2-methylhexyl(meth)acrylate, 2-ethylhexyl(meth)acrylate, 2-ethylhexyl(meth)acrylate, 2-butylhexyl(meth)acrylate, isooctyl(meth)acrylate, isopentyl(meth)acrylate, isononyl(meth)acrylate, isodecyl(meth) acrylate, isobornyl(meth)acrylate, cyclohexyl(meth)acrylate, benzyl(meth)acrylate, phenoxy(meth)acrylate, n-nonyl (meth)acrylate, n-decyl(meth)acrylate, lauryl(meth)acrylate, hexadecyl(meth)acrylate, stearyl(meth)acrylate, morpholine-4-yl(meth)acrylate, and urethane(meth)acrylate. Among these, urethane(meth)acrylate is preferable from the viewpoint of modulus of elasticity of a cured product.

Examples of a resin used in a resonant portion include a compound having an ethylenically unsaturated bond. Examples of the compound having an ethylenically unsaturated bond include: an aromatic vinyl monomer such as styrene, α-methylstyrene, α-chlorostyrene, vinyl toluene, or divinylbenzene; a vinyl ester monomer such as vinyl acetate, vinyl butyrate, N-vinyl formamide, N-vinyl acetamide, N-vinyl-2-pyrrolidone, N-vinylcaprolactam, or divinyl adipate; a vinylether such as ethyl vinyl ether or phenyl vinyl ether; an allyl compound such as diallyl phthalate, trimethylol propanediaryl ether, or allyl glycidyl ether; a (meth) acrylamide such as (meth)acrylamide, N,N-dimethyl(meth) acrylamide, N-methylol(meth)acrylamide, N-methoxymethyl(meth)acrylamide, N-butoxymethyl (meth)acrylamide, N-t-butyl(meth)acrylamide, (meth)acryloyl morpholine, or methylenebis(meth)acrylamide; a mono (meth)acrylate such as (meth)acrylic acid, methyl(meth)acrylate, ethyl(meth)acrylate, propyl(meth)acrylate, n-butyl (meth)acrylate, i-butyl(meth)acrylate, t-butyl(meth)acrylate, hexyl(meth)acrylate, 2-ethylhexyl(meth)acrylate, lauryl (meth)acrylate, stearyl(meth)acrylate, tetrahydrofurfuryl (meth)acrylate, morphoryl(meth)acrylate, 2-hydroxyethyl (meth)acrylate, 2-hydroxypropyl(meth)acrylate, 4-hydroxybutyl(meth)acrylate, glycidyl(meth)acrylate, dimethylaminoethyl(meth)acrylate, diethylaminoethyl(meth)acrylate, benzyl(meth)acrylate, cyclohexyl(meth)acrylate, phenoxyethyl(meth)acrylate, tricyclodecane(meth)acrylate, dicyclopentenyl(meth)acrylate, allyl(meth)acrylate, 2-ethoxyethyl(meth)acrylate, isobornyl(meth)acrylate, or phenyl(meth)acrylate; a polyfunctional(meth)acrylate such as ethylene glycol di(meth)acrylate, diethylene glycol di(meth)acrylate, triethylene glycol di(meth)acrylate, tetraethylene glycol di(meth)acrylate, polyethylene glycol di(meth)acrylate (number of repeating units: 5 to 14), propylene glycol di(meth)acrylate, dipropropylene glycol di(meth)acrylate, tripropylene glycol di(meth)acrylate, tetrapropylene glycol di(meth)acrylate, polypropylene glycol di(meth)acrylate (number of repeating units: 5 to 14), 1,3-butylene glycol di(meth)acrylate, 1,4-butanediol di(meth) acrylate, polybutylene glycol di(meth)acrylate (number of repeating units: 3 to 16), poly(1-methylbutylene glycol) di(meth)acrylate (number of repeating units: 5 to 20), 1,6-hexanediol di(meth)acrylate, 1,9-nonanediol di(meth)acrylate, neopentyl glycol di(meth)acrylate, di(meth)acrylate of neopentyl glycol hydroxypivalate, di(meth)acrylate of dicyclopentanediol, a di(meth)acrylic acid ester of a caprolactone adduct of neopentyl glycol hydroxypivalate (n+m=2 to 5), a di(meth)acrylic acid ester of a γ-butyrolactone adduct of neopentyl glycol hydroxypivalate (n+m=2 to 5), a di(meth)acrylic acid ester of a caprolactone adduct of neopentyl glycol (n+m=2 to 5), a di(meth)acrylic acid ester of a caprolactone adduct of butylene glycol (n+m=2 to 5), a di(meth)acrylic acid ester of a caprolactone adduct of cyclohexanedimethanol (n+m=2 to 5), a di(meth)acrylic acid ester of a caprolactone adduct of dicyclopentanediol (n+m=2 to 5), a di(meth)acrylic acid ester of a caprolactone adduct of bisphenol A (n+m=2 to 5), a di(meth)acrylic acid ester of a caprolactone adduct of bisphenol F (n+m=2 to 5), a di(meth) acrylic acid ester of a bisphenol A ethylene oxide adduct (p=1 to 7), a di(meth)acrylic acid ester of a bisphenol A propylene oxide adduct (p=1 to 7), a di(meth)acrylic acid ester of a bisphenol F ethylene oxide adduct (p=1 to 7), a di(meth)acrylic acid ester of a bisphenol F propylene oxide adduct (p=1 to 7), trimethylolpropane tri(meth)acrylate, a tri(meth)acrylic acid ester of a trimethylolpropane ethylene oxide adduct (p=1 to 5), a tri(meth)acrylic acid ester of a trimethylolpropane propylene oxide adduct (p=1 to 5), glycerin tri(meth)acrylate, a tri(meth)acrylic acid ester of a glycerine ethylene oxide adduct (p=1 to 5), ditrimethylolpropane tetra(meth)acrylate, a tetra(meth)acrylic acid ester of a ditrimethylol propane ethylene oxide adduct (p=1 to 5), a pentaerythritol tri(meth)acrylate, a pentaerythritol tetra (meth)acrylate, a tri(meth)acrylic acid ester of a pentaerythritol ethylene oxide adduct (p=1 to 5), a tetra(meth)acrylic acid ester of a pentaerythritol ethylene oxide adduct (p=1 to 15), a tri(meth)acrylic acid ester of a pentaerythritol propylene oxide adduct (p=1 to 5), a tetra(meth)acrylic acid ester of a pentaerythritol propylene oxide adduct (p=1 to 15), a penta(meth)acrylic acid ester of a dipentaerythritol ethylene oxide adduct (p=1 to 5), a hexa(meth)acrylic acid ester of a dipentaerythritol ethylene oxide adduct (p=1 to 15), a poly (meth)acrylate such as N,N',N"-tris(meth)acryloxy-poly (p=1 to 4)(ethoxy)ethyl)isocyanurate, a tri(meth)acrylic acid ester of a pentaerythritol caprolactone (4 to 8 moles) adduct, a tetra(meth)acrylic acid ester of a pentaerythritol caprolactone (4 to 8 moles) adduct, a dipentaerythritol penta(meth) acrylic acid ester, a dipentaerythritol hexa(meth)acrylic acid ester, a penta(meth)acrylic acid ester of a dipentaerythritol caprolactone (4 to 12 moles) adduct, a hexa(meth)acrylic acid ester of a dipentaerythritol caprolactone (4 to 12 moles) adduct, N,N',N"-tris(acryloxyethyl) isocyanurate, N,N'-bis (acryloxyethyl)-N"-hydroxyethyl isocyanurate, isocyanuric acid ethylene oxide modified (meth)acrylate, isocyanuric acid propylene oxide modified (meth)acrylate, or isocyanuric acid ethylene oxide propylene oxide modified (meth) acrylate; and an epoxy poly(meth)acrylate obtained through an addition reaction of a polyepoxy compound having a plurality of intramolecular epoxy groups with a (meth) acrylic acid such as bisphenol A glycidyl ether, bisphenol F glycidyl ether, a phenolic novolac epoxy resin, a cresol novolac epoxy resin, pentaerythritol polyglycidyl ether, trimethylol propane triglycidyl ether, or triglycidyl tris(2-hydroxyethyl) isocyanurate. Among these, phenoxyethyl acrylate, benzyl acrylate, 2-ethylhexyl(meth)acrylate, and methoxypolyethylene glycol acrylate, which have a low modulus of elasticity of a cured product, are preferable, and 2-ethylhexyl(meth)acrylate and methoxypolyethylene glycol acrylate are more preferable. These may be used singly or in a mixture of two or more kinds thereof.

The content of a resin and/or an elastomer in a resonant portion can be adjusted as appropriate in terms of sound insulating performance, manufacturing cost, other functions, and the like, and is not particularly limited. For example, the content is usually 70% by weight or more, and is preferably 80% by weight or more. The content may be 100% by weight, and is preferably 99% by weight or less.

When a resonant portion includes a photo-curable resin or an elastomer, a photopolymerization initiator is preferably included from the viewpoint of improving moldability and mechanical strength, reducing manufacturing costs, and the like, and examples of the photopolymerization initiator include benzoin, acetophenone, thioxanthone, phosphine oxide, and peroxide photopolymerization initiators. Specific examples of the above-described photopolymerization initiators include benzophenone, 4,4-bis(diethylamino)benzophenone, 2,4,6-trimethylbenzophene, methyl orthobenzoyl benzoate, 4-phenylbenzophenone, t-butyl anthraquinone, 2-ethyl anthraquinone, diethoxyacetophenone, 2-hydroxy-2-methyl-1-phenylpropan-1-one 2-hydroxy-1-{4-[4-(2-hydroxy-2-methyl-propionyl)-benzyl]phenyl}-2-methyl-propan-1-one, benzyl dimethyl ketal, 1-hydroxycyclohexyl-phenyl ketone, benzoin methyl ether, benzoin ethyl ether, benzoin isopropyl ether, benzoin isopropyl ether, benzoin isobutyl ether, 2-methyl-[4-(methylthio)phenyl]-2-morpholino-1-propanone, 2-benzyl-2-dimethylamino-1-(4-morpholinophenyl)-butanone-1, diethylthioxanthone, isopropylthioxanthone, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)-phenylphosphine oxide, and methylbenzoylformate. These materials may be used singly, or two or more of them may be used together in any combination and ratio.

The content of a photopolymerization initiator in a resonant portion is not particularly limited, and is usually 0.1% by weight or more, preferably 0.3% by weight or more, and 0.5% by weight or more, from the viewpoint of improving mechanical strength and maintaining an appropriate reaction rate. The content is usually 3% by weight or less, and preferably 2% by weight or less.

A resonant portion may include a particle, a plate, a sphere, or the like in order to improve sound insulating performance, other functions, and the like. These materials are not limited, and examples thereof include a metallic material, an inorganic material, and an organic material.

A resonant portion may contain inorganic particles from the viewpoint of improving mechanical strength and reducing material cost, and examples thereof include transparent inorganic particles such as silicon oxide, aluminum oxide, titanium oxide, soda glass, or diamond. In addition to such inorganic particles, particles of a resin such as an acrylic resin, a styrene resin, a silicone resin, a melamine resin, an epoxy resin, or a copolymer of these resins can also be used as fine particles.

A resonant portion may contain a variety of additives such as a flame retardant, an antioxidant, a plasticizer, a defoaming agent, or a mold release agent as other components as long as the sound insulating performance is not inhibited, and these additives can be used singly, or in combination of two or more kinds thereof.

A flame retardant is an additive that is blended in order for a flammable material to be made less flammable or not to ignite. Examples of the flame retardant include, but are not limited to, a bromine compound such as pentabromodiphenyl ether, octabromodiphenyl ether, decabromodiphenyl ether, tetrabromobisphenol A, hexabromocyclododecane, or hexabromobenzene, a phosphorus compound such as triphenylphosphate, a chlorine compound such as chlorinated paraffin, an antimony compound such as antimony trioxide, a metal hydroxide such as aluminum hydroxide, a nitrogen compound such as melamine cyanurate, and a boron compound such as sodium borate.

An antioxidant is an additive that is blended for preventing oxidative degradation. Specific examples of the antioxidant include, but are not limited to, a phenolic antioxidant, a sulfur antioxidant, and a phosphorus antioxidant.

A plasticizer is an additive that is blended for improving flexibility or weather resistance. Examples of the plasticizer include, but are not limited to, a phthalate ester, an adipate ester, a trimellitic ester, a polyester, a phosphate ester, a citrate ester, a sebacate ester, an azelaic acid ester, a maleic acid ester, a silicone oil, a mineral oil, a vegetable oil, and a modified product thereof.

From the viewpoint of moldability or productivity, a material of a resonant portion is preferably to be easily integrated, for example, compatible with a material of a sheet portion, which will be described later, and in particular, these materials are preferably to be the same. A resonant portion may contain a liquid material such as a mineral oil, vegetable oil, or silicone oil. When a resonant portion contains a liquid material, the liquid material is desirably encapsulated in a polymeric material from the viewpoint of inhibiting leakage of the liquid material to the outside.

<1-1-2. Configuration>

Figure 2:
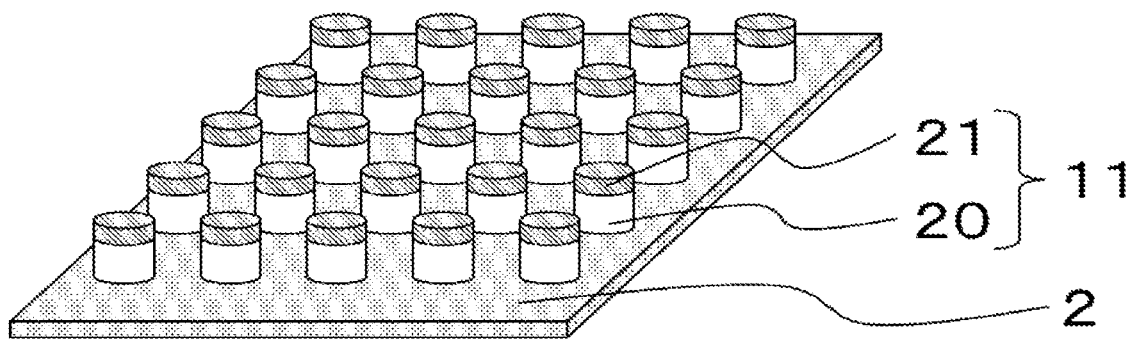
FIG. 2 is a perspective view of a sound insulating structure body, which is one embodiment of the present invention.
Figure 3:
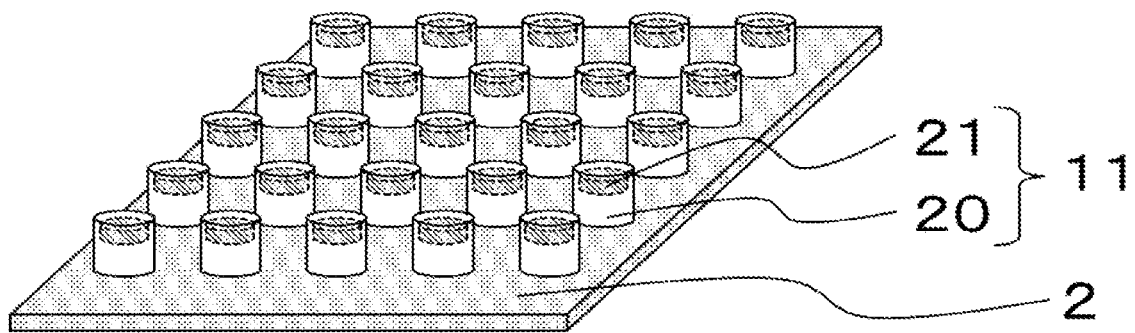
FIG. 3 is a perspective view of a sound insulating structure body, which is one embodiment of the present invention.

A resonant portion functions as an oscillator (resonator) that vibrates at a certain frequency when a sound wave is incident from a noise source. A resonant portion can provide a high sound insulating performance that exceeds the mass law when a sound wave is incident from a noise source. A resonant portion may have a configuration of a single structure body as shown in FIG. 1, or may be composed of a composite structure body including a base portion and a weight portion supported by the base portion and having a mass greater than that of the base portion, as shown in FIG. 2. Further, a resonant portion may be composed of a composite structure body in which a weight portion is buried in a base portion, as shown in FIG. 3. In such a composite structure body, a resonant portion effectively functions as a resonator having a resonance frequency determined by the mass of a weight portion acting as a weight and the spring constant of a base portion acting as a spring. A resonant portion may be a porous body containing pores (a gas such as air).

The external shape of a resonant portion is not particularly limited, and any shape such as a triangular column, a trapezoidal column, a trapezoidal column, a polygonal column such as a pentagonal column or a hexagonal column, a circular column, an elliptical column, a truncated pyramid, a truncated cone, a pyramid, a cone, a hollow tube, a branched shape, or an indefinite shape not classified as one of the above can be adopted. A resonant portion can also be formed into a column shape having different cross-sectional area and/or cross-sectional shape depending on the height position of the resonant portion.

The arrangement of resonant portions, the number of the resonant portions provided, the size of the resonant portions, and the like can be set as appropriate according to a desired performance, and are not particularly limited. In the case of using a sheet portion, as described below, a resonant portion is preferably provided in contact with at least one face of the sheet portion. In FIG. 1, a plurality of resonant portions are arranged in a grid pattern at equal intervals, but the arrangement of the resonant portions is not particularly limited thereto. For example, a plurality of resonant portions may be arranged in a staggered or random arrangement. Since a sound insulating mechanism by a sound insulating structure body, which is the present embodiment, does not utilize Bragg scattering like in the case of a so-called phononic crystal, resonant portions do not necessarily have to be arranged at regular and periodic intervals.

Although the number of resonant portions per unit area is not particularly limited as long as the number is more than one (two or more), it is preferable that resonant portions are arranged in such a way that the resonant portions do not interfere with each other due to contact, or the like, and when the diameter of a section of a cylinder is 5 mm, the number of resonant portions per 100 $cm^2$ is preferably from 0.1 to 4, more preferably from 0.1 to 3, and still more preferably from 0.2 to 2, from the viewpoint of improving sound insulating performance and reducing the overall weight of a sound insulating structure body.

When the diameter of a section of a cylinder is 1 mm, the number of resonant portions per 100 $cm^2$ is preferably from 1 to 50, and more preferably from 1 to 40, from the viewpoint of improving sound insulating performance and reducing the overall weight of a sound insulating structure body.

The height, volume, or the like of a resonant portion is not particularly limited, and since the smaller the resonant portion is, the greater the sound insulating effect for high sound tends to be, while the larger the resonant portion is, the greater the sound insulating effect for low sound tends to be, they can be set appropriately according to desired performances. From the viewpoint of ease of molding, improvement in productivity, and the like, the height is preferably from 50 μm to 100 mm, more preferably from 100 μm to 50 mm, and still more preferably from 1 mm to 30 mm. From the same viewpoint, the volume of each resonant portion is preferably from 1 $cm^3$ to 300 $cm^3$, and more preferably from 2 $cm^3$ to 200 $cm^3$. When the resonant portion is a cylinder, the diameter of a section of the cylinder is preferably from 0.5 mm to 20 mm, and more preferably from 1 mm to 10 mm, from the same viewpoint. By setting the above values within preferable numerical ranges, winding and layering of a structure body with a resonant portion becomes easier, allowing for so-called roll-to-roll manufacturing or storage, which tends to increase productivity and economy.

The constituent material, arrangement, shape, size, direction of installation, and the like of resonant portions need not necessarily be the same for all the plurality of resonant portions. By providing a plurality of resonant portions differing at least one of these types, the frequency domain in which a high sound insulating performance appears can be expanded.

[Base Portion]

The material or shape of abase portion in cases in which a resonant portion is composed of a composite structure body in which a resonant portion is composed of the base portion and a weight portion can be set under the same conditions as for the resonant portion described above, and the same is true for a preferred range. Note that the preferred ranges of height and volume are considered as the height and volume of an entire composite structure body including the base portion and the weight portion combined.

[Weight Portion]

The shape of a weight portion is not particularly limited as long as the mass of the weight portion is greater than that of the above-described base portion. A weight portion may be composed of a composite structure body supported on a base portion, or may be composed of a composite structure buried in a base portion. In the case of a composite structure body in which a weight portion is buried, the weight portion may be completely buried in a base portion or only partially buried in a base portion. Furthermore, from the viewpoint of reducing the thickness or weight of a sound insulating structure body, or improving the sound insulating performance, it is preferable to arrange a base portion and a weight portion in such a manner that the center of gravity (center of mass) of a resonant portion is at least on the tip side of the resonant portion from the center of the height direction of the resonant portion.

The material constituting a weight portion may be selected as appropriate in consideration of mass, cost, and the like, and the type of the material is not particularly limited. From the viewpoint of miniaturization of a sound insulating structure body, improvement of the sound insulating performance, and the like, the material constituting a weight portion is preferably a material having a high specific gravity. Specific examples of the material include, but are not limited to, a metal or alloy such as aluminum, stainless steel, iron, tungsten, gold, silver, copper, lead, zinc, or brass; an inorganic glass such as soda glass, quartz glass, or lead glass; and a composite containing a powder of these metals or alloys, these inorganic glasses, or the like in a polymeric material of the above-described base portion. The material, mass, and specific gravity of a weight portion may be determined in such a manner that the acoustic band gap of a sound insulating structure body matches a desired sound insulating frequency domain. Among these, from the viewpoint of low cost and high specific gravity, or the like, at least one material selected from the group consisting of a metal, an alloy, and an inorganic glass is preferable.

<1-2. Sheet Portion>

Figure 4:
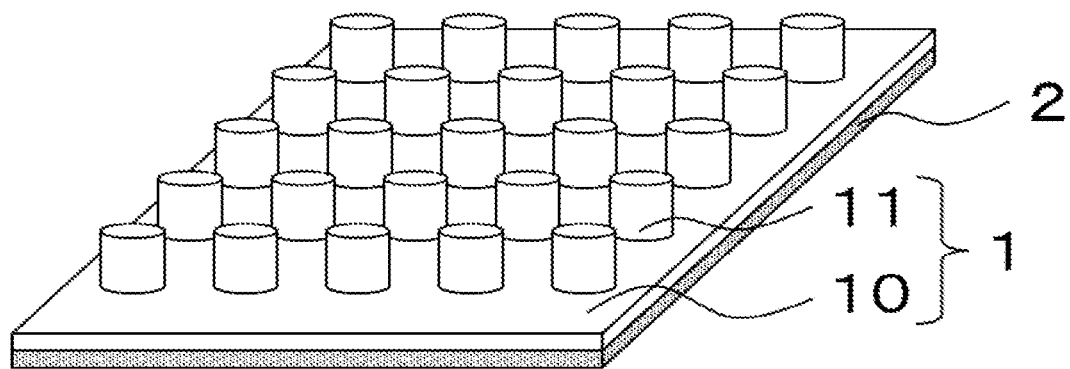
FIG. 4 is a perspective view of a sound insulating structure body including a sheet portion, which is one embodiment of the present invention.

A resonant portion may be provided directly on a support, as shown in FIG. 1, or may be provided on a support via a rubber-elastic sheet portion, as shown in FIG. 4, and a specific aspect thereof can include a sound insulating sheet member (also simply referred to as "sound insulating sheet member") including a resonant portion and a rubber-elastic sheet portion (sometimes simply referred to as "sheet portion" or "sheet") on which the resonant portion is provided, the sound insulating sheet member is layered on a support.

<1-2-1. Material>

The material of a sheet portion is not particularly limited as long as the material is different from that of a support described below, and can be selected from a group of materials similar to those of resins and/or elastomers used in the above-described sound insulating sheet members, and these materials may be used singly, or two or more materials may be used together in any combination and ratio. In addition, other components used in the members may be included. From the viewpoint of moldability or productivity, a material of a resonant portion is preferably to be easily integrated, for example, compatible with a material of a sheet portion, and in particular, these materials are preferably to be the same. A resonant portion may contain a liquid material such as a mineral oil, vegetable oil, or silicone oil. When a resonant portion contains a liquid material, the liquid material is desirably encapsulated in a polymeric material from the viewpoint of inhibiting leakage of the liquid material to the outside.

<1-2-2. Configuration>

The shape of a sheet portion when observed in plan view is not particularly limited, and any plan view shape such as a triangular shape, a square shape, an oblong shape, a rectangular shape, a trapezoidal shape, a rhombus shape, a polygonal shape such as a pentagon shape or a hexagon shape, a circular shape, an oval shape, or an indefinite shape that is not classified as one of the above can be adopted. A sheet may have a notch portion, a punched hole, or the like at any location from the viewpoint of improving elasticity performance, reducing weight, or the like, within a scope that does not deviate from the gist of the present invention.

The shape of a sheet portion is not particularly limited as long as the shape is in the form of a sheet, and since the frequency band (acoustic bandgap width or frequency position) in which high sound insulating performance is exhibited can be controlled by the thickness of the sheet portion, the thickness of the sheet portion can be set appropriately in such a manner that the acoustic band gap matches a desired sound insulating frequency domain. When the thickness of a sheet portion is thick, the acoustic bandgap width tends to be narrower and shifted to the low frequency side. When the thickness of a sheet portion is thin, the acoustic bandgap width tends to be wider and shifted to the high frequency side. The thickness of a sheet portion is preferably 0.5 µm or more, more preferably 1 µm or more, and still more preferably 5 µm or more from the viewpoint of sound insulating performance, mechanical strength, flexibility, handleability, and the like. The thickness of a sheet portion is preferably 10 mm or less, more preferably 5 mm or less, and still more preferably 1 mm or less.

The height of a sound insulating sheet member including a resonant portion and a sheet portion may be changed as appropriate depending on the application, and from the viewpoint of sound insulating performance and productivity, the height is preferably 50 µm or more, more preferably 100 µm or more, and particularly preferably 500 µm or more, and on the other hand, the height is preferably 10 mm or less, more preferably 8 mm or less, and particularly preferably 6 mm or less.

<1-3. Support>

The support used in the embodiment, for example, when a sheet portion is used, is provided on one side of the sheet portion to support the sheet portion and has an areal density of 1.0 kg/m$^2$ or less.

In the present invention, the "sound insulating sheet member" does not include a support.

As shown in FIG. 4, when a configuration including a sheet portion is adopted, due to a support, for example, when a sound wave is incident from a noise source on the support side, a resonance of the sheet occurs. At this time, a frequency domain in which the direction of a force acting on the support and the direction of an acceleration generated in the sheet portion are reversed can exist, and some or all of vibrations of a specific frequency are cancelled out, resulting in a complete acoustic band gap in which vibrations of a specific frequency are almost completely absent. As a result, some or all of vibrations are stationary near the resonance frequency of the sheet, resulting in high sound insulating performance that exceeds the law of mass. A sound insulating member utilizing such a principle is called an acoustic metamaterial. A structure body including at least a resonant portion and a support is referred to as a "sound insulating structure body".

The material constituting a support is not particularly limited as long as the material is capable of supporting a resonant portion or a sheet portion, and from the viewpoint of improving the sound insulating performance, a material having a higher rigidity than that of the resonant portion or the sheet portion is preferable. Specifically, a support preferably has a Young's modulus of 1 GPa or more, and more preferably 1.5 GPa or more. The upper limit of the Young's modulus is not particularly limited, and is, for example, 1,000 GPa or less.

When a sheet portion is directly placed on a device, structure body, or the like, a face on which the sheet portion is placed is preferably as rigid as the above-described support from the viewpoint of supporting the sheet portion, improving sound insulating performance, and the like.

Specific examples of the material constituting a support include, but are not specifically limited to, an organic material such as polyacrylonitrile, polyethylene terephthalate, polybutylene terephthalate, polyethylene naphthalate, polyvinyl chloride, polyvinylidene chloride, polychlorotrifluoroethylene, polyethylene, polypropylene, polystyrene, cyclic polyolefin, polynorbornene, polyethersulfone, polyetheretheretherketone, polyphenylene sulfide, polyarylate, polycarbonate, polyamide, polyimide, triacetylcellulose, polystyrene, an epoxy resin, an acrylic resin, or an oxazine resin, and a composite material containing a metal such as aluminum, stainless steel, iron, copper, zinc, or brass, inorganic glass, an inorganic particle, or a fiber in such an organic material. Among these, from the viewpoint of sound insulating performance, rigidity, moldability, cost, and the like, a support is preferably at least one selected from the group consisting of a photo-curable resin sheet, a thermosetting resin sheet, a thermoplastic resin sheet, a metal plate, and an alloy plate, and in particular, from the viewpoint of flexibility and durability, polypropylene or polyethylene terephthalate is preferable, and among these, polyethylene terephthalate is most preferable.

Here, the thickness of a support is not particularly limited, and from the viewpoint of sound insulating performance, rigidity, moldability, weight reduction, cost, and the like, the thickness is usually 0.03 mm or more, and preferably 0.04 mm or more, and more preferably 0.05 mm or more, and on the other hand, the thickness is preferably 1 mm or less, more preferably 0.7 mm or less, and particularly preferably 0.5 mm or less.

The shape of a support is not limited to the aspect shown in FIG. 1, and can be appropriately set according to the installation surface. For example, a support may have a flat sheet shape, a curved sheet shape, or a special shape processed to include a curved portion, a bent portion, or the like. Further, from the viewpoint of weight reduction and the like, a notch, a punched portion, or the like may be provided at any position of a support.

A support may include an adhesive layer or the like on a face of the support for attachment to another member. A face of a support including an adhesive layer or the like is not particularly limited, and the support may have one or more such faces.

<1-4. Rib-Shaped Protrusion>

Figure 5:
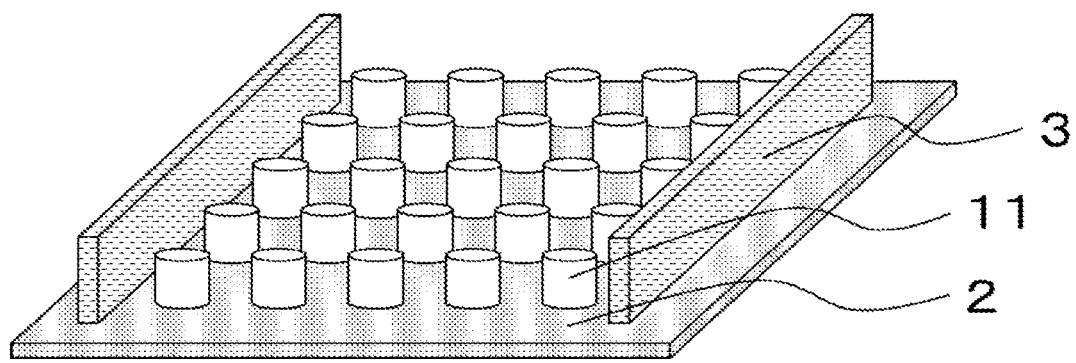
FIG. 5 is a perspective view of a sound insulating structure body including a rib-shaped protrusion, which is one embodiment of the present invention.
Figure 6:
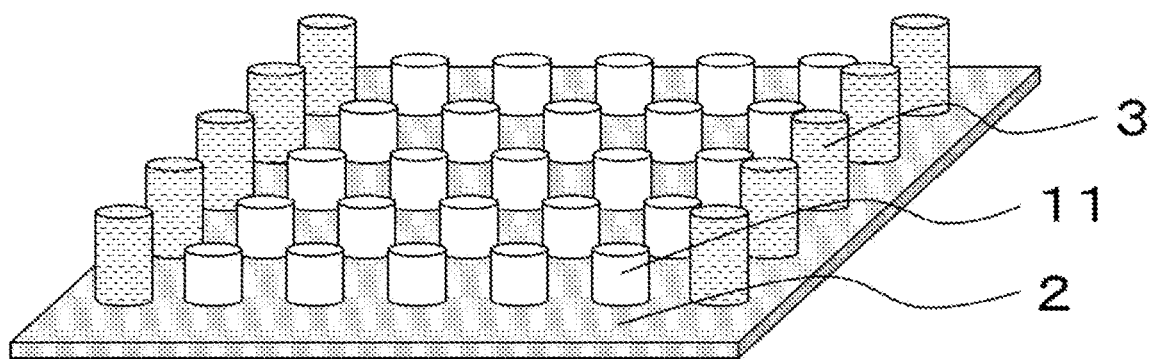
FIG. 6 is a perspective view of a sound insulating structure body including a rib-shaped protrusion, which is one embodiment of the present invention.

As shown in FIGS. 5 and 6, a sound insulating structure body may be provided with a rib-shaped protrusion, which is present on the side of a face of the sound insulating structure body on the side on which a resonant portion is present, has a greater height than that of the resonant portion, and is formed in an external shape such as substantially a plate shape or substantially a cylindrical shape. As a result, even when a sound insulating structure body is rolled up, or a plurality of such bodies are piled up, contact of a resonant portion with a back face of a sound insulating structure body is inhibited because a rib-shaped protrusion functions as a spacer. As a specific aspect of a rib-shaped protrusion, an aspect illustrated in WO2017/135409 can be adopted. In the present embodiment, the "sound insulating sheet member" does not include a rib-shaped protrusion.

<1-5. Property>

Properties of each member will be described below, and in the case of measurement of a resonant portion or a sheet portion, as a test piece for measurement, a test piece actually cut from the resonant portion or the sheet portion may be used, or a test piece prepared for evaluation using the same materials and conditions as those of the resonant portion or the sheet portion may be used. This is the same in the second and third embodiments described below.

When a sheet portion is employed, the description of properties of a resonant portion among the following properties may be applied to the sheet portion as well. In other words, it is preferable to employ a suitable numerical range of the resonant portion as the numerical range of the properties of the sheet portion.

Among the following properties, regarding the storage modulus, the loss factor, and the tensile elongation at break for a resonant portion, a target for measurement is a resin portion or an elastomer portion in the resonant portion. For example, when a resonant portion is used in a configuration composed of a base portion and a weight portion, a target for measurement of the storage modulus is the base portion excluding the weight portion. This is the same in the second and third embodiments described below.

When the materials of a resonant portion and a sheet portion, which will be described below, are the same, the properties of the sheet portion can be employed as the properties of the resonant portion. This is the same in the second and third embodiments described below.

[Storage Modulus]

The storage modulus G' (also simply referred to as "storage modulus") of a resonant portion at 25° C. and 10 kHz is preferably 100 MPa or less, preferably 95 MPa or less, and more preferably 90 MPa or less, from the viewpoint of sound insulating performance, mechanical strength, flexibility, handleability, productivity, and the like. The smaller the storage modulus of a resonant portion, the more preferable, and from the viewpoint of the above, the lower limit does not need to be set, and from the viewpoint of shape transferability, the storage modulus is 0.1 MPa or more, and preferably 1 MPa or more.

When the storage modulus is within the above-described range, the resonance frequency is generated at a low frequency side, and therefore the sound insulating performance of a target sound insulating domain tends to be improved.

The storage modulus at 25° C. and 5 kHz is also not particularly limited. From the viewpoint of sound insulating performance, mechanical strength, flexibility, handleability, and productivity, or the like, the storage modulus is preferably 80 MPa or less, and more preferably 75 MPa or less. The smaller the storage modulus of a resonant portion, the more preferable, and although the lower limit of the storage modulus is not particularly limited, for example, the lower limit is 1 MPa or more.

Herein, the storage modulus in the present embodiment refers to an index related to retention of a stress stored inside, and is obtained by creating a master curve (composite curve) according to the WLF (Williams-Landel-Ferry) law according to ISO 6721-4 from actual measured values and determining the modulus at 1 Hz band, 5 kHz band, or 10 kHz band.

The storage modulus can be controlled by changing the molecular weight or the type of bonding of a resin or the like, or by adding a filler, and in general, the storage modulus increases with an increase in molecular weight, an increase in bonding force, or addition of a filler. Further, for example, when a molded body is produced by blending a resin having a low storage modulus and a resin having a high storage modulus, the storage modulus of the molded body can be controlled by adjusting the blend ratio of these resins.

[Loss Factor]

The peak temperature of the loss factor (hereinafter, also referred to as "tan δ") of a resonant portion is usually 20° C. or less, preferably 10° C. or less, more preferably 0° C. or less, still more preferably −20° C. or less, and particularly preferably −30° C. or less, from the viewpoint of sound insulating performance, tackiness, mechanical strength, flexibility, handleability, productivity, and the like. The temperature is usually −100° C. or more, preferably −80° C. or more, and more preferably −60° C. or more. Here, the tan δ in the present embodiment is calculated by the loss modulus (which represents the viscosity)/storage modulus (which represents the elasticity), and is an index indicating which of the property of elasticity or the property of viscosity is dominant, and means a value at 1 Hz of the loss factor measured by the non-resonance method of "Plastics-Determination of dynamic mechanical properties—Part 4: Tensile vibration—" in accordance with ISO 6721-4.

The peak temperature of the tan δ can be controlled by using materials with different glass transition temperatures of cured products together, and adjusting the ratios of these materials used.

[Specific Gravity]

In general, the properties of a vibration damping and sound insulating material follow the so-called law of mass. Specifically, the transmission loss, which is an indicator of the amount of noise reduction, is determined by the logarithm of the product of the mass of a vibration damping and sound insulating material and the frequency of an elastic wave or sound wave. Therefore, in order to achieve a greater reduction in noise at a certain frequency, the mass of a vibration damping and sound insulating material is needed to be increased. Therefore, although a higher specific gravity of a resonant portion is preferable, a higher specific gravity reduces the handleability and increases the transportation cost.

In view of the above, the specific gravity of a resonant portion is usually 1.0 g/cm³ or more, and preferably 1.01 g/cm³ or more. The specific gravity is usually 3.0 g/cm³ or less, and preferably 2.5 g/cm³ or less.

Although the specific gravities of a plurality of resonant portions may differ from each other, from the viewpoint of securing stable sound insulating performance, the specific gravities are preferably uniform. Here, uniform specific gravities mean that the difference between the maximum and minimum specific gravities of a plurality of resonant portions is within 0.5 g/cm³.

Specific gravity means the ratio of the mass of a material to the mass of pure water at 4° C. under a pressure of 1013.25 hPa of the same volume, and herein, the value measured by "Test methods for density and relative density of chemical products" in accordance with JIS K 0061 is used.

[Areal Density]

The areal density of a support is 1.0 kg/m² or less, and preferably 0.9 kg/m² or less, more preferably 0.8 kg/m² or less, and particularly preferably 0.7 kg/m² or less, and on the other hand, is preferably 0.01 kg/m² or more, more preferably 0.03 kg/m² or more, particularly preferably 0.05 kg/m² or more. When the areal density is in this range, since a support is not too heavy with respect to a resonant portion, the resonant portion can act as a weight to suppress vibrations for the support, improving the sound insulating effect. The areal density can be adjusted by the thickness or material of a support.

The areal density of a support can be determined by multiplying the specific gravity of the support by the thickness of the support.

[Acoustic Transmission Loss]

The acoustic transmission loss of a sound insulating structure body is preferably 0.5 dB or more, and more preferably 1.0 dB or more. Here, the acoustic transmission loss in the present embodiment refers to the difference between the sound pressure at a predetermined point in a space (sound source chamber) where a sound is generated and the sound pressure at a predetermined point in another space (sound receiving chamber) where the sound is generated in one of the two spaces divided by a sheet as a boundary.

An example of the measurement conditions for acoustic transmission loss is described below.

A white noise is generated from the inside of a small reverberation box to which a sound insulating structure body is attached, and the acoustic transmission loss (TL) can be determined from the difference in sound pressure between microphones installed inside and outside of the small reverberation box, based on the following Formula (1). Sound pressure difference between microphones installed inside and outside of a reverberation box $$TL\ [dB] = L_{in} - L_{out} - 3 \tag{1}$$

$L_{in}$: Internal microphone sound pressure level [dB]
$L_{out}$: External microphone sound pressure level [dB]
Incident sound: White noise
Sample to Microphone Distance: 10 mm <1-6. Molding Method>

[Resonant Portion]

A method of molding a resonant portion is not particularly limited, and a known molding method of a resin or an elastomer can be employed. In the case of a thermosetting or thermoplastic resin or elastomer, for example, a melt molding method such as a press molding, an extrusion molding, or an injection molding can be used, and in such cases, molding conditions such as the temperature or pressure at which melt molding is performed can be changed appropriately depending on the type of material used. In the case of a photo-curable resin or elastomer, for example, such a resin can be injected into a plate-shaped molding mold which is permeable to active energy rays and irradiated with an active energy ray to photo-cure.

The active energy ray used for curing a photo-curable resin or the like is only needed to cure a photo-curable resin or the like to be used, and examples thereof include an ultraviolet ray and an electron beam. The amount of irradiation of an active energy ray is only needed to cure a photo-curable resin or the like to be used, and, in consideration of the type and amount of a monomer and a polymerization initiator, for example, an ultraviolet ray with a wavelength of from 200 to 400 nm is usually irradiated in the range of from 0.1 to 200 J. A chemical lamp, a xenon lamp, a low-pressure mercury lamp, a high-pressure mercury lamp, a metal halide lamp, or the like is used as a light source of an active energy ray. Although irradiation of an active energy ray may be performed in a single stage, it is preferable to perform irradiation in a plurality of stages, at least two stages, in order to obtain a resonant portion of a photo-curable resin having favorable surface properties. When a photo-curable resin is used, a curing accelerator may be contained.

[Combination of Resonant Portion and Support]

The method of combining a resonant portion and a support is not particularly limited, and can be either a method of bonding a resonant portion after molding and a support, or a method of molding a resonant portion on a support. In the case of bonding methods, it is preferable to use an adhesive, and the type of an adhesive is not limited as long as the adhesive can bond a resonant portion and a support.

[Sheet Portion]

The same method of forming a sheet portion can be employed as the method of forming a resonant portion described above.

The method of forming a sound insulating structure body including a sheet portion is not particularly limited, and can be either a method of bonding a molded resonant portion and a molded sheet portion, or a method of simultaneously forming a resonant portion and a sheet portion, and from the viewpoint of ease of stabilization of properties and inhibition of separation of the sheet portion and the resonant portion, a method of simultaneously forming the resonant portion and the sheet portion is preferable. With this method, a sound insulating structure body in which a sheet portion and a resonant portion (sound insulating sheet member) are integrally molded can be obtained.

In the method of bonding a molded sheet portion and a molded resonant portion, a sheet portion can be molded by the method described in the molding method of a resonant portion described above. On the other hand, a sheet portion, like a resonant portion, can be formed by a general known molding method such as press molding, extrusion molding, or injection molding. In the case of the bonding method, it is preferable to use an adhesive, and the type of adhesive is not limited as long as a sheet portion and a resonant portion can be bonded together.

In the case of a thermosetting or thermoplastic resin or elastomer, for example, the method described in WO2017/135409 can be employed for the method of simultaneously molding a sheet portion and a resonant portion. Specifically, molding can be performed by preparing a mold including a plurality of cavities, pouring a resin or elastomeric material into the cavities, curing the poured resin or elastomeric material by heat, and furthermore, releasing the cured product from the mold. In the case of a photo-curable resin or elastomer, for example, molding can be performed by photo-curing with an active energy ray instead of heat curing in the above-described method of molding a thermosetting resin or the like. In this case, the amount of irradiation, the wavelength, and a light source of an active energy ray may be the same as those of the above-described method of forming a sheet.

Combination of a sheet portion and a support can be performed by the same method as the method of combining a resonant portion and a support as described above.

In the above-described method of simultaneously molding a resonant portion and a sheet portion, the resonant portion may be released from the sheet portion when a cured product is released from a mold, and the shape of a cavity may not be appropriately transferred. Separation of a sheet portion from a resonant portion is caused by stress concentrated on a boundary portion between the resonant portion and the sheet portion when a cured product is released from a mold due to occurrence of friction between the mold and the cured product, expansion of the material due to a curing reaction, pressure in the mold caused by the cured product in the mold, or the like.

In order to suppress separation between a resonant portion and a sheet portion, from the viewpoint of the structure, the resonant portion is considered to be tapered to the tip of the resonant portion, but there is a problem of limiting selection of the shape of the resonant portion and a problem of increasing the manufacturing cost of a mold. Therefore, it is desirable to improve the design from the viewpoint of the material.

Examples of a material which is not released even when stress concentration occurs include a material which is difficult to break under load, or a material which has a large tensile elongation at break. The elongation of the material of a resonant portion or a sheet portion is usually 30% or more, preferably 40% or more, more preferably 50% or more, and particularly preferably 100% or more, and is usually 500% or less, preferably 400% or less, and more preferably 300% or less. When the tensile elongation at break is equal to or greater than the above-described lower limit value, the material tends to be difficult to break even when a load is applied, and when the tensile elongation at break is equal to or less than the above-described upper limit value, a stretched shape tends to be easily restored. When the tensile elongation at break falls within these ranges, the transferability tends to be excellent.

The value of tensile elongation at break is measured under the conditions of a tensile speed of 5 mm/min in accordance with ISO 527.

2. Second Embodiment

A sound insulating sheet member (in the present embodiment, hereinafter, also simply referred to as "sound insulating sheet member" or "sheet") of a second embodiment of the present invention is a rubber-elastic sound insulating sheet member having a storage modulus G' obtained from a composite curve of dynamic viscoelasticity according to ISO 6721-4 of 100 MPa or less at 25° C. and 10 kHz, and having an uneven structure on at least one face of the sound insulating sheet member. A perspective view of one aspect of the sound insulating sheet member is shown in FIG. 7.

Figure 7:
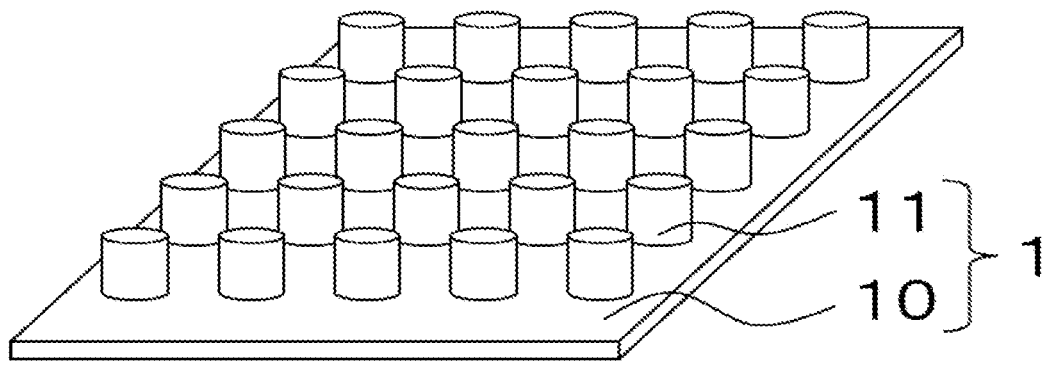
FIG. 7 is a perspective view of a sound insulating sheet member having an uneven structure, which is one embodiment of the present invention.

Examples of the uneven structure include a structure in which a resonant portion is provided on one face of the above-described sound insulating sheet member, as illustrated in FIG. 7. The resonant portion is described below, and the resonant portion illustrated in WO2017/135409 can also be employed.

<2-1. Sound Insulating Sheet Member>
<2-1-1. Material>

The type of material used for a sound insulating sheet member (sheet) is not particularly limited as long as the dynamic viscoelasticity can be measured, or as long as the material has rubber elasticity, and examples thereof include a resin and an elastomer, and to a specific aspect of them, materials or properties of the resonant portion in the first embodiment described above can be applied in the same manner.

A composition for a sound insulating sheet member described in a third embodiment described below can also be used.

To a specific aspect of an additive such as a polymerization initiator, the materials and properties of the resonant portion in the first embodiment described above can be applied in the same manner.

<2-1-2. Configuration>

The shape of a sheet when observed in plan view is not particularly limited, and any plan view shape such as a triangular shape, a square shape, an oblong shape, a rectangular shape, a trapezoidal shape, a rhombus shape, a polygonal shape such as a pentagon shape or a hexagon shape, a circular shape, an oval shape, or an indefinite shape that is not classified as one of the above can be adopted. A sheet may have a notch portion, a punched hole, or the like at any location from the viewpoint of improving elasticity performance, reducing weight, or the like, within a scope that does not deviate from the gist of the present invention.

The shape of a sheet is not particularly limited as long as the shape is in the form of a sheet, and since the frequency band (acoustic bandgap width or frequency position) in which high sound insulating performance is exhibited can be controlled by the thickness of the sheet, the thickness of the sheet can be set appropriately in such a manner that the acoustic band gap matches a desired sound insulating frequency domain. When the thickness of a sheet is thick, the acoustic bandgap width tends to be narrower and shifted to the low frequency side. When the thickness of a sheet is thin, the acoustic bandgap width tends to be wider and shifted to the high frequency side. The thickness of a sheet is preferably 0.5 µm or more, more preferably 1 µm or more, and still more preferably 5 µm or more from the viewpoint of sound insulating performance, mechanical strength, flexibility, handleability, and the like. The thickness of a sheet is preferably 10 mm or less, more preferably 5 mm or less, and still more preferably 1 mm or less.

A sheet may include a support on at least one side of the sheet, as shown in FIG. 4. Due to a support, for example, when a sound wave is incident from a noise source on the support side, a resonance of the sheet occurs. At this time, a frequency domain in which the direction of a force acting on the support and the direction of an acceleration generated in the sheet are reversed can exist, and some or all of vibrations of a specific frequency are cancelled out, resulting in a complete acoustic band gap in which vibrations of a specific frequency are almost completely absent. As a result, some or all of vibrations are stationary near the resonance frequency of the sheet, resulting in high sound insulating performance that exceeds the law of mass. A sound insulating member utilizing such a principle is called an acoustic metamaterial. In the present embodiment, a support is not included in the "sound insulating sheet member".

The material constituting a support is not particularly limited as long as the material is capable of supporting a sheet, and from the viewpoint of improving the sound insulating performance, a material having a higher rigidity than that of the sheet is preferable. Specifically, a support preferably has a Young's modulus of 1 GPa or more, and more preferably 1.5 GPa or more. The upper limit of the Young's modulus is not particularly limited, and is, for example, 1,000 GPa or less.

When a sheet is directly placed on a device, structure body, or the like, a face on which the sheet is placed is preferably as rigid as the above-described support from the viewpoint of supporting the sheet, improving sound insulating performance, and the like.

To a material constituting a support, the same materials or properties of the support in the first embodiment described above can be applied in the same manner.

The thickness of a support is not particularly limited, and from the viewpoint of sound insulating performance, rigidity, moldability, weight reduction, cost, and the like, the thickness is preferably usually from 0.1 mm to 50 mm.

The shape of a support is not limited to the aspect shown in FIG. 4, and can be appropriately set according to the installation surface. For example, a support may have a flat sheet shape, a curved sheet shape, or a special shape processed to include a curved portion, a bent portion, or the like. Further, from the viewpoint of weight reduction and the like, a notch, a punched portion, or the like may be provided at any position of a support.

A support may include an adhesive layer or the like on a face of the support for attachment to another member. A face of a support including an adhesive layer or the like is not particularly limited, and the support may have one or more such faces.

<2-2. Properties>
[Storage Modulus]

The storage modulus of a sound insulating sheet member (sheet portion) at 25° C. and 10 kHz is preferably 100 MPa or less, preferably 95 MPa or less, and more preferably 90 MPa or less, from the viewpoint of sound insulating performance, mechanical strength, flexibility, handleability, productivity, and the like. The smaller the storage modulus of a sheet, the more preferable, and from the viewpoint of the above, the lower limit does not need to be set, and for example, the storage modulus is 0.1 MPa or more, and preferably 1 MPa or more.

When the storage modulus is within the above-described range, the resonance frequency of an uneven structure portion is generated at a low frequency side, and therefore the sound insulating performance of a target sound insulating domain tends to be improved.

The storage modulus at 25° C. and 5 kHz is also not particularly limited. From the viewpoint of sound insulating performance, mechanical strength, flexibility, handleability, and productivity, the storage modulus, or the like, is preferably 80 MPa or less, and more preferably 75 MPa or less. The smaller the storage modulus of a sheet portion, the more preferable, and although the lower limit of the storage modulus is not particularly limited, for example, the lower limit is 1 MPa or more.

Herein, the storage modulus in the present embodiment refers to an index related to retention of a stress stored inside, and is obtained by creating a master curve (composite curve) according to the WLF (Williams-Landel-Ferry) law according to ISO 6721-4 from actual measured values and determining the modulus at 1 Hz band, 5 kHz band, or 10 kHz band.

The storage modulus can be controlled by changing the molecular weight or the type of bonding of a resin or the like, or by adding a filler, and in general, the storage modulus increases with an increase in molecular weight, an increase in bonding force, or addition of a filler. Further, for example, when a molded body is produced by blending a resin having a low storage modulus and a resin having a high storage modulus, the storage modulus of the molded body can be controlled by adjusting the blend ratio of these resins.

[Specific Gravity]

In general, the properties of a vibration damping and sound insulating material follow the so-called law of mass. Specifically, the transmission loss, which is an indicator of the amount of noise reduction, is determined by the logarithm of the product of the mass of a vibration damping and sound insulating material and the frequency of an elastic wave or sound wave. Therefore, in order to achieve a greater reduction in noise at a certain frequency, the mass of a vibration damping and sound insulating material is needed to be increased. Therefore, although a higher specific gravity of a sheet is preferable, a higher specific gravity reduces the handleability and increases the transportation cost.

In view of the above, the specific gravity of a sheet is usually 1.0 g/cm$^3$ or more, and preferably 1.01 g/cm$^3$ or more. The specific gravity is usually 3.0 g/cm$^3$ or less, and preferably 2.5 g/cm$^3$ or less.

Specific gravity means the ratio of the mass of a material to the mass of pure water at 4° C. under a pressure of 1013.25 hPa of the same volume, and herein, the value measured by "Test methods for density and relative density of chemical products" in accordance with JIS K 0061 is used.

[Acoustic Transmission Loss]

The acoustic transmission loss of a sound insulating structure body is preferably 0.5 dB or more, and more preferably 0.8 dB or more. Here, the acoustic transmission loss in the present embodiment refers to the difference between the sound pressure at a predetermined point in a space (sound source chamber) where a sound is generated and the sound pressure at a predetermined point in another space (sound receiving chamber) where the sound is generated in one of the two spaces divided by a sheet as a boundary.

As an example of the measurement conditions for acoustic transmission loss, an example of the measurement conditions described in the first embodiment may be employed.

<2-3. Molding Method>

A method of molding a sound insulating sheet member (sheet) is not particularly limited, and a commonly known sheet molding method can be employed. In the case of a thermosetting or thermoplastic resin or elastomer, for example, a melt molding method such as a press molding, an extrusion molding, or an injection molding can be used, and in such cases, molding conditions such as the temperature or pressure at which melt molding is performed can be changed appropriately depending on the type of material used. In the case of a photo-curable resin or elastomer, for example, such a resin can be injected into a plate-shaped molding mold which is permeable to active energy rays and irradiated with an active energy ray to photo-cure.

The active energy ray used for curing a photo-curable resin or the like is only needed to cure a photo-curable resin or the like to be used, and examples thereof include an ultraviolet ray and an electron beam. The amount of irradiation of an active energy ray is only needed to cure a photo-curable resin or the like to be used, and, in consideration of the type and amount of a monomer and a polymerization initiator, for example, an ultraviolet ray with a wavelength of from 200 to 400 nm is usually irradiated in the range of from 0.1 to 200 J. A chemical lamp, a xenon lamp, a low-pressure mercury lamp, a high-pressure mercury lamp, a metal halide lamp, or the like is used as a light source of an active energy ray. Although irradiation of an active energy ray may be performed in a single stage, it is preferable to perform irradiation in a plurality of stages, at least two stages, in order to obtain a photo-curable resin sheet having favorable surface properties. When a photo-curable resin is used, a curing accelerator may be contained.

When a support is used, the method of combining a sheet and a support is not particularly limited, and can be either a method of bonding a sheet after molding and a support, or a method of molding a sheet on a support. In the case of bonding methods, it is preferable to use an adhesive, and the type of an adhesive is not limited as long as the adhesive can bond a sheet and a support.

<2-4. Uneven Structure>

A sound insulating sheet member (sheet) has an uneven structure on at least one face of the sound insulating sheet member. In the present embodiment, an uneven structure refers to a structure including a plurality of protrusions, and the shape and material of the protrusions are not particularly limited. The uneven structure may be formed by deforming a sound insulating sheet member, or may be formed with a material different from the sound insulating sheet member as the protrusions. Furthermore, the uneven structure may be formed on one face of a sound insulating sheet member or may be formed on a plurality of faces. In a configuration using a support, the unevenness may be on a face opposite the support and layering face of a sheet, or it may be on the same face as the layering face. These may be appropriately selected according to the application in terms of sound insulating performance, manufacturing cost, handleability, and the like.

Examples of the uneven structure include a structure in which a resonant portion is provided on one face of the above-described sound insulating sheet member, as shown in FIG. 7. The resonant portion is described below, and the resonant portion illustrated in WO2017/135409 can also be employed.

[Resonant Portion]

Figure 8:
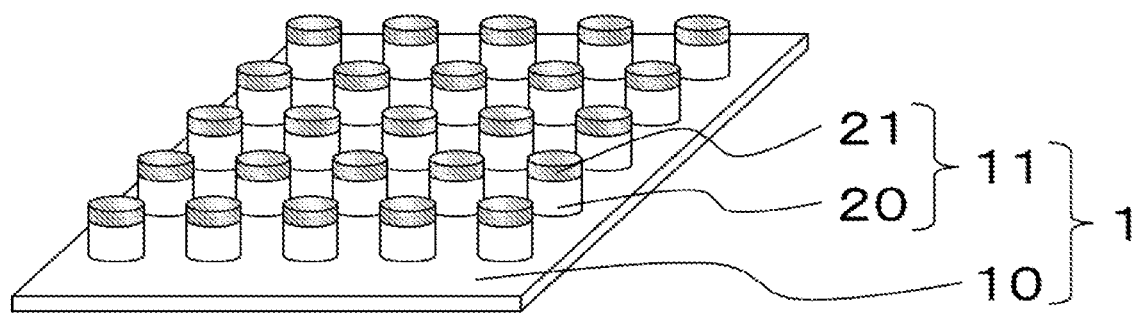
FIG. 8 is a perspective view of a sound insulating sheet member having an uneven structure, which is one embodiment of the present invention.
Figure 9:
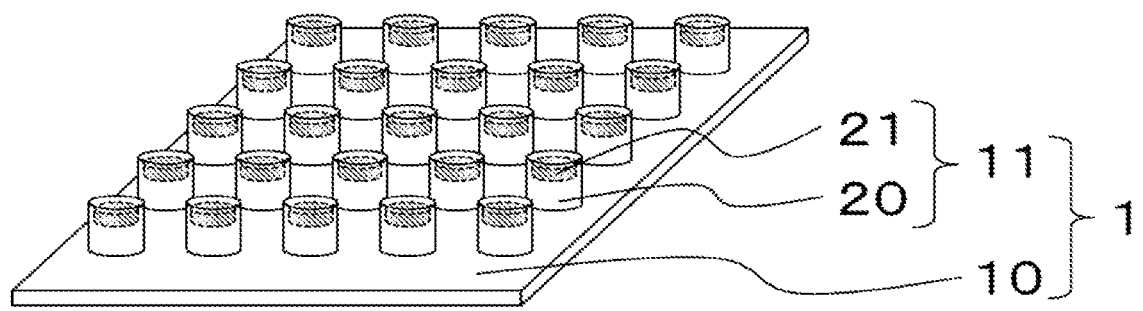
FIG. 9 is a perspective view of a sound insulating sheet member having an uneven structure, which is one embodiment of the present invention.

A resonant portion functions as an oscillator (resonator) that vibrates at a certain frequency when a sound wave is incident from a noise source. A resonant portion can provide a high sound insulating performance that exceeds the mass law when a sound wave is incident from a noise source. A resonant portion may have a configuration of a single structure body as shown in FIG. 7, or may be composed of a composite structure body including a base portion and a weight portion supported by the base portion and having a mass greater than that of the base portion, as shown in FIG. 8. Further, a resonant portion may be composed of a composite structure body in which a weight portion is buried in a base portion, as shown in FIG. 9. In such a composite structure body, a resonant portion effectively functions as a resonator having a resonance frequency determined by the mass of a weight portion acting as a weight and the spring constant of a base portion acting as a spring. A resonant portion may be a porous body containing pores (a gas such as air).

The external shape of a resonant portion is not particularly limited, and any shape such as a triangular column, a rectangular column, a trapezoidal column, a polygonal column such as a pentagonal column or a hexagonal column, a circular column, an elliptical column, a truncated pyramid, a truncated cone, a pyramid, a cone, a hollow tube, a branched shape, or an indefinite shape not classified as one of the above can be adopted. A resonant portion can also be formed into a column shape having different cross-sectional area and/or cross-sectional shape depending on the height position of the resonant portion.

The material of a resonant portion can be selected from a group of materials similar to those of resins and/or elastomers used in the above-described sound insulating sheet members, and these materials may be used singly, or two or more materials may be used together in any combination and ratio. In addition, other components used in the members may be included. From the viewpoint of moldability or productivity, a material of a resonant portion is preferably to be easily integrated, for example, compatible with a material of a sound insulating sheet member, and in particular, these materials are preferably to be the same. A resonant portion may contain a liquid material such as a mineral oil, vegetable oil, or silicone oil. When a resonant portion contains a liquid material, the liquid material is desirably encapsulated in a polymeric material from the viewpoint of inhibiting leakage of the liquid material to the outside.

The arrangement of resonant portions, the number of the resonant portions provided, the size of the resonant portions, and the like can be set as appropriate according to a desired performance, and are not particularly limited. A resonant portion is provided in contact with at least one face of a sound insulating sheet member. For example, a plurality of resonant portions are arranged in a grid pattern at equal intervals, but the arrangement of the resonant portions is not particularly limited thereto. For example, a plurality of resonant portions may be arranged in a staggered or random arrangement. Since a sound insulating mechanism by a sound insulating sheet member, which is the present embodiment, does not utilize Bragg scattering like in the case of a so-called phononic crystal, resonant portions do not necessarily have to be arranged at regular and periodic intervals.

The number of resonant portions per unit area is not particularly limited as long as the resonant portions can be arranged in such a way that the resonant portions do not interfere with each other due to contact, or the like. For example, when the diameter of a section of a cylinder is 5 mm, the number of resonant portions per 100 $cm^2$ is preferably from 0.1 to 4, and more preferably from 0.1 to 3, from the viewpoint of improving sound insulating performance and reducing the overall weight of a sound insulating sheet member.

When the diameter of a section of a cylinder is 1 mm, the number of resonant portions per 100 $cm^2$ is preferably from 1 to 50, and more preferably from 1 to 40, from the viewpoint of improving sound insulating performance and reducing the overall weight of a sound insulating sheet member.

The height, volume, or the like of a resonant portion is not particularly limited, and since the smaller the resonant portion is, the greater the sound insulating effect for high sound tends to be, while the larger the resonant portion is, the greater the sound insulating effect for low sound tends to be, they can be set appropriately according to desired performances. From the viewpoint of ease of molding, improvement in productivity, and the like, the height is preferably from 50 μm to 100 mm, more preferably from 100 μm to 50 mm, and still more preferably from 1 mm to 30 mm. From the same viewpoint, the volume of each resonant portion is preferably from 1 $cm^3$ to 300 $cm^3$, and more preferably from 2 $cm^3$ to 200 $cm^3$. When the resonant portion is a cylinder, the diameter of a section of the cylinder is preferably from 0.5 mm to 20 mm, and more preferably from 1 mm to 10 mm, from the same viewpoint. By setting the above values within preferable numerical ranges, winding and layering of a sound insulating sheet member with a resonant portion becomes easier, allowing for so-called roll-to-roll manufacturing or storage, which tends to increase productivity and economy.

The constituent material, arrangement, shape, size, direction of installation, and the like of resonant portions need not necessarily be the same for all the plurality of resonant portions. By providing a plurality of resonant portions differing at least one of these types, the frequency domain in which a high sound insulating performance appears can be expanded.

[Base Portion]

The material or shape of a base portion in cases in which a resonant portion is composed of a composite structure body in which a resonant portion is composed of the base portion and a weight portion can be set under the same conditions as for the resonant portion described above, and the same is true for a preferred range. Note that the preferred ranges of height and volume are considered as the height and volume of an entire composite structure body including the base portion and the weight portion combined.

[Weight Portion]

The shape of a weight portion is not particularly limited as long as the mass of the weight portion is greater than that of the above-described base portion. A weight portion may be composed of a composite structure body supported on a base portion, or may be composed of a composite structure buried in a base portion. In the case of a composite structure body in which a weight portion is buried, the weight portion may be completely buried in a base portion or only partially buried in a base portion. Furthermore, from the viewpoint of reducing the thickness or weight of a sound insulating sheet member, or improving the sound insulating performance, it is preferable to arrange a base portion and a weight portion in such a manner that the center of gravity (center of mass) of a resonant portion is at least on the tip side of the resonant portion from the center of the height direction of the resonant portion.

The material constituting a weight portion may be selected as appropriate in consideration of mass, cost, and the like, and the type of the material is not particularly limited. From the viewpoint of miniaturization of a sound insulating sheet member, improvement of the sound insulating performance, and the like, the material constituting a weight portion is preferably a material having a high specific gravity. Specific examples of the material include, but are not limited to, a metal or alloy such as aluminum, stainless steel, iron, tungsten, gold, silver, copper, lead, zinc, or brass; an inorganic glass such as soda glass, quartz glass, or lead glass; and a composite containing a powder of these metals or alloys, these inorganic glasses, or the like in a polymeric material of the above-described base portion. The material, mass, and specific gravity of a weight portion may be determined in such a manner that the acoustic band gap of a sound insulating sheet member matches a desired sound insulating frequency domain. Among these, from the viewpoint of low cost and high specific gravity, at least one material selected from the group consisting of a metal, an alloy, and an inorganic glass is preferable.

[Rib-Shaped Protrusion]

Figure 10:
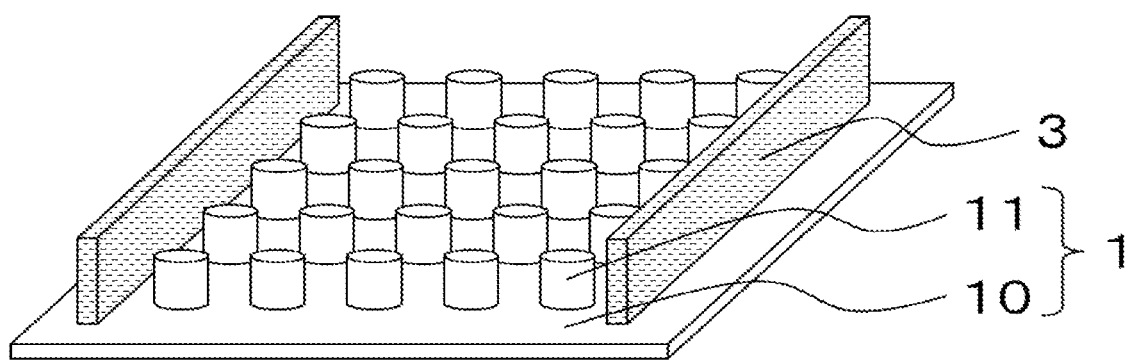
FIG. 10 is a perspective view of a sound insulating sheet member having an uneven structure and including a rib-shaped protrusion, which is one embodiment of the present invention.
Figure 11:
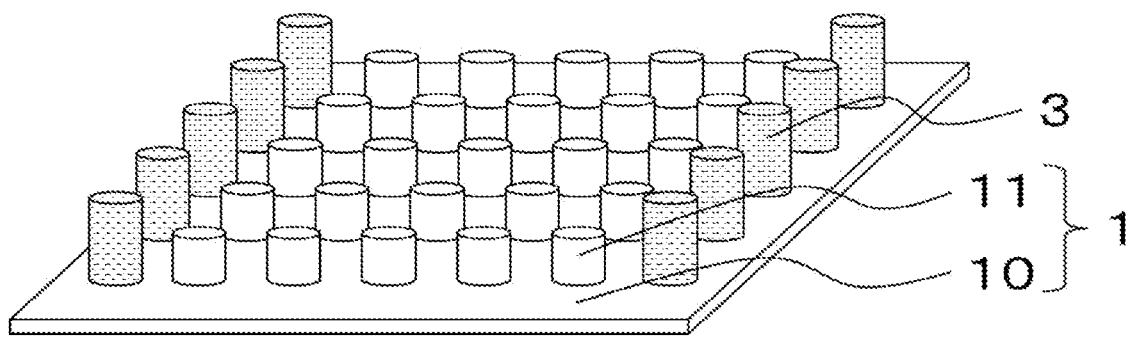
FIG. 11 is a perspective view of a sound insulating sheet member having an uneven structure and including a rib-shaped protrusion, which is one embodiment of the present invention.

As shown in FIGS. 10 and 11, a sound insulating sheet member including a resonant portion may be provided with a rib-shaped protrusion, which is present on the side of a face of a sheet on the side on which a resonant portion is present, has a greater height than that of the resonant portion, and is formed in an external shape such as substantially a plate shape or substantially a cylindrical shape. As a result, even when a sound insulating sheet member is rolled up, or a plurality of such members are piled up, contact of a resonant portion with a back face of a sound insulating sheet member is inhibited because a rib-shaped protrusion functions as a spacer. As a specific aspect of a rib-shaped protrusion, an aspect illustrated in WO2017/135409 can be adopted. In the present embodiment, the "sound insulating sheet member" does not include a rib-shaped protrusion.

[Method of Molding Sound Insulating Sheet Member Including Resonant Portion]

The method of forming a sound insulating sheet member including a resonant portion is not particularly limited, and may be either a method of bonding a molded sheet and a molded resonant portion, or a method of simultaneously forming a sheet and a resonant portion.

In a method of bonding a molded sheet and a molded resonant portion, a sheet can be molded by the method described in the method of molding a sound insulating sheet member described above. On the other hand, for a resonant portion, like for a sheet, a commonly known molding method such as press molding, extrusion molding, or injection molding can be employed. A method of combining a sheet and a resonant portion is not particularly limited, and can be either a method of bonding a molded sheet and a molded resonant portion or a method of molding a resonant portion on a formed sheet. In the case of a bonding method, it is preferable to use an adhesive, but there is no limitation on the type of adhesive as long as it is possible to bond a sheet and a resonant portion.

In the case of a thermosetting or thermoplastic resin or elastomer, for example, the method described in WO2017/135409 can be employed for the method of simultaneously molding a sheet and a resonant portion. Specifically, molding can be performed by preparing a mold including a plurality of cavities, pouring a resin or elastomeric material into the cavities, curing the poured resin or elastomeric material by heat, and furthermore, releasing the cured product from the mold. In the case of a photo-curable resin or elastomer, for example, molding can be performed by photo-curing with an active energy ray instead of heat curing in the above-described method of molding a thermosetting resin or the like. In this case, the amount of irradiation, the wavelength, and a light source of an active energy ray, or the like, may be the same as those of the above-described method of forming a sheet.

In the above-described method of simultaneously molding a sheet and a resonant portion, the resonant portion may be released from the sheet when a cured product is released from a mold, and the shape of a cavity may not be appropriately transferred. Separation of a sheet from a resonant portion is caused by stress concentrated on a boundary portion between the sheet and the resonant portion when a cured product is released from a mold due to occurrence of friction between the mold and the cured product, expansion of the material due to a curing reaction, pressure in the mold caused by the cured product in the mold, or the like.

In order to suppress separation between a sheet and a resonant portion, from the viewpoint of the structure, the resonant portion is considered to be tapered to the tip of the resonant portion, but there is a problem of limiting selection of the shape of the resonant portion and a problem of increasing the manufacturing cost of a mold. Therefore, it is desirable to improve the design from the viewpoint of the material.

Examples of a material which is not released even when stress concentration occurs include a material which is difficult to break under load, or a material which has a large tensile elongation at break. The elongation of the material of a sheet or a resonant portion is usually 30% or more, preferably 40% or more, more preferably 50% or more, and particularly preferably 100% or more, and is usually 500% or less, preferably 400% or less, and more preferably 300% or less. When the tensile elongation at break is equal to or greater than the above-described lower limit value, the material tends to be difficult to break even when a load is applied, and when the tensile elongation at break is equal to or less than the above-described upper limit value, a stretched shape tends to be easily restored. When the tensile elongation at break falls within these ranges, the transferability tends to be excellent.

The value of tensile elongation at break is measured under the conditions of a tensile speed of 5 mm/min in accordance with ISO 527.

3. Third Embodiment

A composition for a sound insulating sheet member (hereinafter, also simply referred to as "composition"), which is a third embodiment of the present invention, is a composition for a sound insulating sheet member, wherein a cured product thereof has rubber elasticity, and the peak temperature of tan δ obtained by measuring the dynamic viscoelasticity of the cured product in accordance with ISO 6721-4 is 20° C. or less at 1 Hz.

A cured product of the above-described composition for a sound insulating sheet member can be used as a sheet portion or a resonant portion in the above-described first embodiment and second embodiment.

When a resonant portion is used for a sound insulating sheet member, a material described in this section can be used as the material for this member.

<3-1. Composition for Sound Insulating Sheet Member>

The type of material used for a sound insulating sheet member obtained by curing a composition is not particularly limited as long as the composition has rubber elasticity and the dynamic viscoelasticity can be measured, and examples thereof include a resin and an elastomer. Examples of the resin include a thermosetting or photo-curable resin and a thermoplastic resin, and examples of the elastomer include a thermosetting or photo-curable elastomer and a thermoplastic elastomer, and among these, a photo-curable resin or a photo-curable elastomer is preferable, and, in particular, from the viewpoint of favorable shape transferability and exhibiting excellent sound insulating function, a photo-curable resin is preferred. When a thermosetting or thermoplastic resin, or a thermosetting or thermoplastic elastomer is used as the material fora sound insulating sheet member, there is a strong tendency for air bubbles to form in a molded sheet due to the need for a thermal curing reaction during molding a sheet. If air bubbles are generated, resonance becomes difficult to achieve and sound insulating performance is reduced. On the other hand, when a photo-curable elastomer is used as the material of a sound insulating sheet member, a problem of air bubbles as described above does not occur, and the sound insulating performance is unlikely to be reduced.

Examples of the resin include: a thermosetting resin such as an unsaturated polyester resin, a phenolic resin, an epoxy resin, an urethane resin, or a rosin-modified maleic acid resin; a photo-curable resin such as a single polymer or a copolymer of monomers such as epoxy acrylate, urethane acrylate, polyester acrylate, polyether acrylate, or a modified product thereof; a single polymer or a copolymer of vinyl monomers such as vinyl acetate, vinyl chloride, vinyl alcohol, vinyl butyral, and vinylpyrrolidone; and a thermoplastic resin such as a saturated polyester resin, a polycarbonate resin, a polyamide resin, a polyolefin resin, a polyarylate resin, a polysulfone resin, and a polyphenylene ether resin, and these materials may be used singly, or two or more of them may be used together in any combination and ratio.

Examples of the elastomer include a thermosetting elastomer such as a thermosetting resin-based elastomer such as a vulcanized rubber such as chemically cross-linked natural or synthetic rubber, urethane rubber, silicone rubber, fluoroelastomer, or acrylic rubber; a thermoplastic elastomer such as an olefin thermoplastic elastomer, a styrene-based thermoplastic elastomer, a vinyl chloride-based thermoplastic elastomer, a urethane-based thermoplastic elastomer, an ester-based thermoplastic elastomer, an amide-based thermoplastic elastomer, a silicone rubber thermoplastic elastomer, or an acrylic-based thermoplastic elastomer, a photo-curable elastomer such as an acrylic-based photo-curable elastomer; a silicone photo-curable elastomer, or an epoxy-based photo-curable elastomer, and these materials may be used singly, or two or more of them may be used together in any combination and ratio.

The composition for a sound insulating sheet member, which is an embodiment of the present invention, preferably contains a photo-curable monomer, a thermosetting monomer, or a thermoplastic monomer as a monomer for obtaining the above-described resin or elastomer, and particularly preferably contains a photo-curable monomer from the viewpoint of having favorable shape transferability and exhibiting an excellent sound insulating function.

Examples of the photo-curable monomer include a (meth)acrylate-based monomer, and an unsaturated polyester-based monomer. Examples of the (meth)acrylate-based monomer include an epoxy(meth)acrylate such as phenol novolac epoxy(meth)acrylate, cresol novolac epoxy(meth)acrylate, or bisphenol epoxy(meth)acrylate, urethane(meth)acrylate, epoxy urethane(meth)acrylate, polyester(meth)acrylate, polyether(meth)acrylate, and polybutadiene modified (meth)acrylate. These monomers may be used singly, and two or more monomers may be used together in any combination and ratio, and from the viewpoint of being capable of controlling properties such as tan δ, storage modulus, and tensile elongation at break, it is preferable to combine two or more of monomers. These monomers may be substituted with any functional group to an extent that does not exceed the gist of the present invention.

The total content of photo-curable monomers, thermosetting monomers, and/or thermoplastic monomers in a composition is not particularly limited, and can be appropriately adjusted in view of sound insulating performance, manufacturing cost, other functions, and the like. Although not particularly limited, for example, the content is usually 70% by weight or more, preferably 80% by weight or more, and may be 100% by weight, and is preferably 99% by weight or less.

In the case of combining two or more monomers, it is preferable to use a combination of a bifunctional monomer ((A) component) (also referred to as "bifunctional monomer (A)") and a monofunctional monomer ((B) component) (also referred to as "monofunctional monomer (B)") as a photo-curable monomer from the viewpoint of the modulus of elasticity of a cured product. Further, in this case, it is preferred to use a radical photopolymerization initiator ((C) component) (also referred to as "radical photopolymerization initiator (C)"), which will be described below, in together.

The type of bifunctional monomer (A) is not particularly limited, and from the viewpoint of the modulus of elasticity of a cured product, an (meth)acrylate is preferred, and examples thereof include methyl(meth)acrylate, ethyl(meth)acrylate, n-propyl(meth)acrylate, i-propyl(meth)acrylate, n-butyl(meth)acrylate, i-butyl(meth)acrylate, t-butyl(meth)acrylate, 2-methylbutyl(meth)acrylate, n-pentyl(meth)acrylate, n-hexyl(meth)acrylate, n-heptyl(meth)acrylate, 2-methylhexyl(meth)acrylate, 2-ethylhexyl(meth)acrylate, 2-ethylhexyl(meth)acrylate, 2-butylhexyl(meth)acrylate, isooctyl(meth)acrylate, isopentyl(meth)acrylate, isononyl (meth)acrylate, isodecyl(meth)acrylate, isobornyl(meth)acrylate, cyclohexyl(meth)acrylate, benzyl(meth)acrylate, phenoxy(meth)acrylate, n-nonyl(meth)acrylate, n-decyl (meth)acrylate, lauryl(meth)acrylate, hexadecyl(meth)acrylate, stearyl(meth)acrylate, morpholine-4-yl(meth)acrylate, and urethane(meth)acrylate. Among these, urethane(meth)acrylate is preferable from the viewpoint of modulus of elasticity of a cured product.

The type of a monofunctional monomer (B) is not particularly limited, and examples of the monomer include a compound having an ethylenically unsaturated bond. Examples of the compound having an ethylenically unsaturated bond include: an aromatic vinyl monomer such as styrene, α-methylstyrene, α-chlorostyrene, vinyl toluene, or divinylbenzene; a vinyl ester monomer such as vinyl acetate, vinyl butyrate, N-vinyl formamide, N-vinyl acetamide, N-vinyl-2-pyrrolidone, N-vinylcaprolactam, or divinyl adipate; a vinylether such as ethyl vinyl ether or phenyl vinyl ether; an allyl compound such as diallyl phthalate, trimethylol propanediaryl ether, or allyl glycidyl ether; a (meth)acrylamide such as (meth)acrylamide, N,N-dimethyl(meth)acrylamide, N-methylol(meth)acrylamide, N-methoxymethyl(meth)acrylamide, N-butoxymethyl (meth)acrylamide, N-t-butyl(meth)acrylamide, (meth)acryloyl morpholine, or methylenebis(meth)acrylamide; a mono (meth)acrylate such as (meth)acrylic acid, methyl(meth)acrylate, ethyl(meth)acrylate, propyl(meth)acrylate, n-butyl (meth)acrylate, i-butyl(meth)acrylate, t-butyl(meth)acrylate, hexyl(meth)acrylate, 2-ethylhexyl(meth)acrylate, lauryl (meth)acrylate, stearyl(meth)acrylate, tetrahydrofurfuryl (meth)acrylate, morphoryl(meth)acrylate, 2-hydroxyethyl (meth)acrylate, 2-hydroxypropyl(meth)acrylate, 4-hydroxybutyl (meth)acrylate, glycidyl (meth)acrylate, dimethylaminoethyl(meth)acrylate, diethylaminoethyl (meth)acrylate, benzyl(meth)acrylate, cyclohexyl(meth)acrylate, phenoxyethyl(meth)acrylate, tricyclodecane(meth)acrylate, dicyclopentenyl(meth)acrylate, allyl(meth)acrylate, 2-ethoxyethyl(meth)acrylate, isobornyl(meth)acrylate, or phenyl(meth)acrylate; a polyfunctional(meth)acrylate such as ethylene glycol di(meth)acrylate, diethylene glycol di(meth)acrylate, triethylene glycol di(meth)acrylate, tetraethylene glycol di(meth)acrylate, polyethylene glycol di(meth)acrylate (number of repeating units: 5 to 14), propylene glycol di(meth)acrylate, dipropylene glycol di(meth)acrylate, tripropylene glycol di(meth)acrylate, tetrapropylene glycol di(meth)acrylate, polypropylene glycol di(meth)acrylate (number of repeating units: 5 to 14), 1,3-butylene glycol di(meth)acrylate, 1,4-butanediol di(meth)acrylate, polybutylene glycol di(meth)acrylate (number of repeating units: 3 to 16), poly(1-methylbutylene glycol) di(meth)acrylate (number of repeating units: 5 to 20), 1,6-hexanediol di(meth)acrylate, 1,9-nonanediol di(meth)acrylate, neopentyl glycol di(meth)acrylate, di(meth)acrylate of neopentyl glycol hydroxypivalate, di(meth)acrylate of dicyclopentanediol, a di(meth)acrylic acid ester of a caprolactone adduct of neopentyl glycol hydroxypivalate (n+m=2 to 5), a di(meth)acrylic acid ester of a γ-butyrolactone adduct of neopentyl glycol hydroxypivalate (n+m=2 to 5), a di(meth)acrylic acid ester of a caprolactone adduct of neopentyl glycol (n+m=2 to 5), a di(meth)acrylic acid ester of a caprolactone adduct of butylene glycol (n+m=2 to 5), a di(meth)acrylic acid ester of a caprolactone adduct of cyclohexanedimethanol (n+m=2 to 5), a di(meth)acrylic acid ester of a caprolactone adduct of dicyclopentanediol (n+m=2 to 5), a di(meth)acrylic acid ester of a caprolactone adduct of bisphenol A (n+m=2 to 5), a di(meth)acrylic acid ester of a caprolactone adduct of bisphenol F (n+m=2 to 5), a di(meth)acrylic acid ester of a bisphenol A ethylene oxide adduct (p=1 to 7), a di(meth)acrylic acid ester of a bisphenol A propylene oxide adduct (p=1 to 7), a di(meth)acrylic acid ester of a bisphenol F ethylene oxide adduct (p=1 to 7), a di(meth)acrylic acid ester of a bisphenol F propylene oxide adduct (p=1 to 7), trimethylolpropane tri(meth)acrylate, a tri(meth)acrylic acid ester of a trimethylolpropane ethylene oxide adduct (p=1 to 5), a tri(meth)acrylic acid ester of a trimethylolpropane propylene oxide adduct (p=1 to 5), glycerin tri(meth)acrylate, a tri(meth)acrylic acid ester of a glycerine ethylene oxide adduct (p=1 to 5), ditrimethylolpropane tetra(meth)acrylate, a tetra(meth)acrylic acid ester of a ditrimethylol propane ethylene oxide adduct (p=1 to 5), a pentaerythritol tri(meth)acrylate, a pentaerythritol tetra(meth)acrylate, a tri(meth)acrylic acid ester of a pentaerythritol ethylene oxide adduct (p=1 to 5), a tetra(meth)acrylic acid ester of a pentaerythritol ethylene oxide adduct (p=1 to 15), a tri(meth)acrylic acid ester of a pentaerythritol propylene oxide adduct (p=1 to 5), a tetra(meth)acrylic acid ester of a pentaerythritol propylene oxide adduct (p=1 to 15), a penta(meth)acrylic acid ester of a dipentaerythritol ethylene oxide adduct (p=1 to 5), a hexa(meth)acrylic acid ester of a dipentaerythritol ethylene oxide adduct (p=1 to 15), a poly (meth)acrylate such as N,N',N''-tris(meth)acryloxy-poly (p=1 to 4)(ethoxy)ethyl)isocyanurate, a tri(meth)acrylic acid ester of a pentaerythritol caprolactone (4 to 8 moles) adduct, a tetra(meth)acrylic acid ester of a pentaerythritol caprolactone (4 to 8 moles) adduct, a dipentaerythritol penta(meth)acrylic acid ester, a dipentaerythritol hexa(meth)acrylic acid ester, a penta(meth)acrylic acid ester of a dipentaerythritol caprolactone (4 to 12 moles) adduct, a hexa(meth)acrylic acid ester of a dipentaerythritol caprolactone (4 to 12 moles) adduct, N,N',N''-tris(acryloxyethyl) isocyanurate, N,N'-bis (acryloxyethyl)-N''-hydroxyethyl isocyanurate, isocyanuric acid ethylene oxide modified (meth)acrylate, isocyanuric acid propylene oxide modified (meth)acrylate, or isocyanuric acid ethylene oxide propylene oxide modified (meth) acrylate; and an epoxy poly(meth)acrylate obtained through an addition reaction of a polyepoxy compound having a plurality of intramolecular epoxy groups with a (meth) acrylic acid such as bisphenol A glycidyl ether, bisphenol F glycidyl ether, a phenolic novolac epoxy resin, a cresol novolac epoxy resin, pentaerythritol polyglycidyl ether, trimethylol propane triglycidyl ether, or triglycidyl tris(2-hydroxyethyl)isocyanurate. These may be used singly or in a mixture of two or more kinds thereof.

Among these, phenoxyethyl acrylate, benzyl acrylate, 2-ethylhexyl (meth)acrylate, and methoxypolyethylene glycol acrylate, which have a low modulus of elasticity of a cured product, are preferable, and 2-ethylhexyl (meth)acrylate and methoxypolyethylene glycol acrylate are more preferable.

In the above-described bifunctional monomer (A) and monofunctional monomer (B), it is preferable that the glass transition temperature (Tg) is low, and it is preferable that there is no tack on the surface of a cured product.

The molecular weight of the bifunctional monomer is not limited, and from the viewpoint of the modulus of elasticity of a cured product, the average molecular weight Mw is usually 1,000 or more, preferably 1,200 or more, and more preferably 1,500 or more. The molecular weight is usually 20,000 or less, and is preferably 18,000 or less. When the molecular weight is within the above-described range, the modulus of elasticity and surface tackiness of a cured product tend to be excellent.

Although the molecular weight of a monofunctional monomer is not particularly limited, from the viewpoint of the modulus of elasticity and surface tackiness of a cured product, the average molecular weight Mw is usually 100 or more, and is preferably 120 or more. The molecular weight is usually 1,000 or less, and is preferably 500 or less. In the above-described range, the modulus of elasticity and surface tackiness of a cured product tend to be excellent.

The content of a bifunctional monomer in a composition is not particularly limited, from the viewpoint of sound insulating performance and manufacturing cost, the content of is usually 30% by weight or more, preferably 35% by weight or more, and more preferably 40% by weight or more. The content is usually 80% by weight or less, preferably 75% by weight or less, and more preferably 70% by weight or less. When the content is in the above-described range, the modulus of elasticity and surface tackiness of a cured product tend to be excellent.

The content of a monofunctional monomer in a composition is not particularly limited, from the viewpoint of sound insulating performance and manufacturing cost, the content is usually 20% by weight or more, preferably 25% by weight or more, and more preferably 30% by weight or more. The content is usually 70% by weight or less, preferably 65% by weight or less, and more preferably 60% by weight or less. When the content is within the above-described range, the modulus of elasticity and surface tackiness of a cured product tend to be excellent.

Furthermore, the ratio of the content of a bifunctional monomer to the content of a monofunctional monomer is not particularly limited, and is usually 30% or more, preferably 35% or more, and more preferably 40% or more, from the viewpoint of sound insulating performance and manufacturing cost. The ratio is usually 80% or less, preferably 75% or less, and more preferably 70% or less. When the ratio is within the above-described range, the modulus of elasticity and surface tackiness of a cured product tend to be excellent.

When a sheet includes a photo-curable resin or an elastomer, a radical photopolymerization initiator (C) is preferably included from the viewpoint of improving moldability and mechanical strength, reducing manufacturing costs, and the like, and examples of the photopolymerization initiator include benzoin, acetophenone, thioxanthone, phosphine oxide, and peroxide. Examples of the above-described photopolymerization initiators include benzophenone, 4,4-bis (diethylamino)benzophenone, 2,4,6-trimethylbenzophene, methyl orthobenzoyl benzoate, 4-phenylbenzophenone, t-butyl anthraquinone, 2-ethyl anthraquinone, diethoxyacetophenone, 2-hydroxy-2-methyl-1-phenylpropan-1-one 2-hydroxy-1-{4-[4-(2-hydroxy-2-methyl-propionyl)-benzyl]phenyl}-2-methyl-propan-1-one, benzyl dimethyl ketal, 1-hydroxycyclohexyl-phenyl ketone, benzoin methyl ether, benzoin ethyl ether, benzoin isopropyl ether, benzoin isopropyl ether, benzoin isobutyl ether, 2-methyl-[4-(methylthio)phenyl]-2-morpholino-1-propanone, 2-benzyl-2-dimethylamino-1-(4-morpholinophenyl)-butanone-1, diethylthioxanthone, isopropylthioxanthone, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)-phenylphosphine oxide, and methylbenzoylformate. These materials may be used singly, or two or more of them may be used together in any combination and ratio.

The content of a radical photopolymerization initiator in a composition is not particularly limited, and is usually 0.1% by weight or more, preferably 0.3% by weight or more, and 0.5% by weight or more, from the viewpoint of improving mechanical strength and maintaining an appropriate reaction rate. The content is usually 3% by weight or less, and preferably 2% by weight or less.

From the viewpoint of improving the mechanical strength of a cured product, the sound insulating performance, and reducing material cost, the composition may contain a particle, a plate, a sphere, or the like. These materials are not limited, and examples thereof include a metallic material, an inorganic material, and an organic material.

A composition may contain inorganic particles from the viewpoint of improving the mechanical strength of a cured product and reducing material cost, and examples thereof include transparent inorganic particles such as silicon oxide, aluminum oxide, titanium oxide, soda glass, or diamond. In addition to such inorganic particles, particles of a resin such as an acrylic resin, a styrene resin, a silicone resin, a melamine resin, an epoxy resin, or a copolymer of these resins can also be used as fine particles.

A composition may contain a variety of additives such as a flame retardant, an antioxidant, a plasticizer, a defoaming agent, or a mold release agent as other components as long as the sound insulating performance is not inhibited, and these additives can be used singly, or in combination of two or more kinds thereof.

A flame retardant is an additive that is blended in order for a flammable material to be made less flammable or not to ignite. Examples of the flame retardant include, but are not limited to, a bromine compound such as pentabromodiphenyl ether, octabromodiphenyl ether, decabromodiphenyl ether, tetrabromobisphenol A, hexabromocyclododecane, or hexabromobenzene, a phosphorus compound such as triphenylphosphate, a chlorine compound such as chlorinated paraffin, an antimony compound such as antimony trioxide, a metal hydroxide such as aluminum hydroxide, a nitrogen compound such as melamine cyanurate, and a boron compound such as sodium borate.

An antioxidant is an additive that is blended for preventing oxidative degradation. Specific examples of the antioxidant include, but are not limited to, a phenolic antioxidant, a sulfur antioxidant, and a phosphorus antioxidant.

A plasticizer is an additive that is blended for improving flexibility or weather resistance. Examples of the plasticizer include, but are not limited to, a phthalate ester, an adipate ester, a trimellitic ester, a polyester, a phosphate ester, a citrate ester, a sebacate ester, an azelaic acid ester, a maleic acid ester, a silicone oil, a mineral oil, a vegetable oil, and a modified product thereof.

<3-2. Sound insulating Sheet Member>

Figure 12:
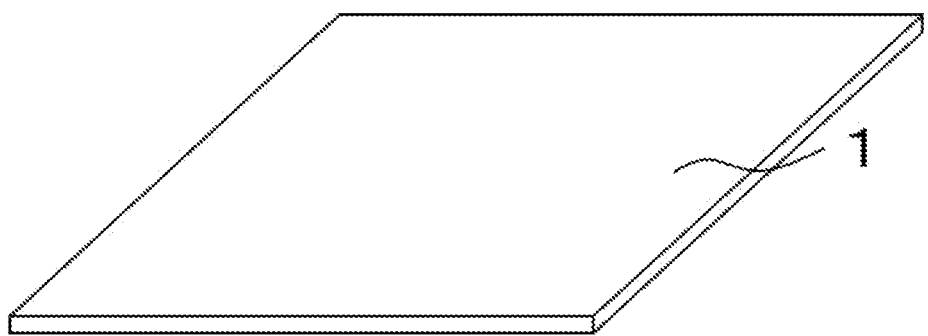
FIG. 12 is a perspective view of a sound insulating sheet member, which is one embodiment of the present invention.

A sound insulating sheet member (hereinafter, also simply referred to as a "sheet"), which is an embodiment of the present invention, is not particularly limited as long as the member is a cured product molded using the above-described composition. A perspective view of one embodiment of the sound insulating sheet member is shown in FIG. 12.

The method of molding a sound insulating sheet member is not particularly limited, and a commonly known sheet molding method can be employed. In the case of a thermosetting or thermoplastic resin or elastomer, for example, a melt molding method such as a press molding, an extrusion molding, or an injection molding can be used, and in such cases, molding conditions such as the temperature or pressure at which melt molding is performed can be changed appropriately depending on the type of material used. In the case of a photo-curable resin or elastomer, for example, such a resin can be injected into a plate-shaped molding mold which is permeable to active energy rays and irradiated with an active energy ray to photo-cure.

The active energy ray used for curing a photo-curable resin or the like is only needed to cure a photo-curable resin or the like to be used, and examples thereof include an ultraviolet ray and an electron beam. The amount of irradiation of an active energy ray is only needed to cure a photo-curable resin or the like to be used, and, in consideration of the type and amount of a monomer and a polymerization initiator, for example, an ultraviolet ray with a wavelength of from 200 to 450 nm is usually irradiated in the range of from 100 to 2,000 mJ/cm$^2$. A chemical lamp, a xenon lamp, a low-pressure mercury lamp, a high-pressure mercury lamp, a metal halide lamp, or the like is used as a light source of an active energy ray. Although irradiation of an active energy ray may be performed in a single stage, it is preferable to perform irradiation in a plurality of stages, at least two stages, in order to obtain a photo-curable resin sheet having favorable surface properties. When a photo-curable resin is used, a curing accelerator may be contained.

When a sound insulating sheet member is formed using a combination of a bifunctional monomer (A) and a monofunctional monomer (B), the sound insulating sheet member includes a constituent unit derived from the bifunctional monomer (A) and a constituent unit derived from the monofunctional monomer (B). A preferred range for the content of these constituent units in the sound insulating sheet member in terms of weight is the same as the range of the content in the composition described above.

Examples of a method for checking the contents of constituent units derived from the bifunctional monomer (A) and constituent units derived from the monofunctional monomer (B) in a sound insulating sheet member include IR, and pyrolysis GC/MS.

<3-2-1. Configuration>

Figure 13:
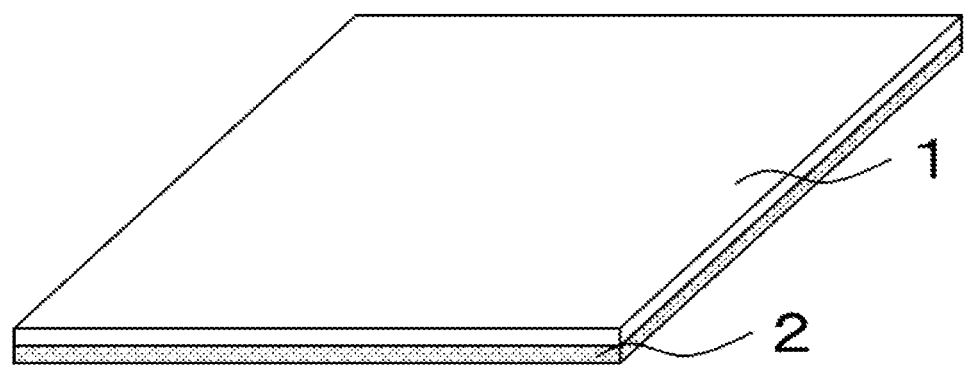
FIG. 13 is a perspective view of a sound insulating sheet member including a support, which is one embodiment of the present invention.

The same configuration as the second embodiment can be employed for the configuration of a sound insulating sheet member, except for the following description. In the case of employing a resonant portion, the same configuration as the second embodiment can be employed for the configuration of the member. The sheet may include a support on at least one face of the sheet, as shown in FIG. 13.

The thickness of the sheet is preferably 0.5 μm or more, more preferably 1 μm or more, and still more preferably 5 μm or more. The thickness of the sheet is preferably 10 mm or less, more preferably 5 mm or less, and still more preferably 1 mm or less.

In the sound insulating sheet member, a cured product of the above-described composition for a sound insulating sheet member is preferably layered on a support supporting the cured product.

<3-2-2. Properties>

The same configuration as the second embodiment can be employed for the properties of a sound insulating sheet member, except for the following description.

[Loss Factor]

The peak temperature of the loss factor (hereinafter, also referred to as "tan δ") of a sheet is usually 20° C. or less, preferably 10° C. or less, more preferably 0° C. or less, still more preferably −20° C. or less, and particularly preferably −30° C. or less, from the viewpoint of sound insulating performance, tackiness, mechanical strength, flexibility, handleability, productivity, and the like. The temperature is usually −100° C. or more, preferably −80° C. or more, and more preferably −60° C. or more. Here, the tan δ in the present embodiment is calculated by the loss modulus (which represents the viscosity)/storage modulus (which represents the elasticity), and is an index indicating which of the properties of elasticity or the property of viscosity is dominant, and means a value at 1 Hz of the loss factor measured by the non-resonance method of "Plastics-Determination of dynamic mechanical properties-Part 4: Tensile vibration-" in accordance with ISO 6721-4.

The peak temperature of the tan δ can be controlled by using materials with different glass transition temperatures of cured products together, and adjusting the ratios of these materials used.

[Storage Modulus]

The storage modulus of a sheet at 25° C. and 10 kHz is not particularly limited, and is 100 MPa or less, preferably 95 MPa or less, and more preferably 90 MPa or less, from the viewpoint of sound insulating performance, mechanical strength, flexibility, handleability, productivity, and the like. The smaller the storage modulus of a sheet, the more preferable, and from the viewpoint of the above, the lower limit does not need to be set, and for example, the storage modulus is 0.1 MPa or more, and preferably 1 MPa or more. When the storage modulus is within the above-described range, the resonance frequency of an uneven structure portion is generated at a low frequency side, and therefore the sound insulating performance of a target sound insulating domain tends to be improved.

The storage modulus at 25° C. and 5 kHz is also not particularly limited. From the viewpoint of sound insulating performance, mechanical strength, flexibility, handleability, and productivity, the storage modulus is preferably 80 MPa or less, and more preferably 75 MPa or less. The smaller the storage modulus of a sheet, the more preferable, and although the lower limit of the storage modulus is not particularly limited, for example, the lower limit is 0.1 MPa or more.

Herein, the storage modulus in the present embodiment refers to an index related to retention of a stress stored inside, and is obtained by creating a master curve (composite curve) according to the WLF (Williams-Landel-Ferry) law according to ISO 6721-4 from actual measured values and determining the modulus at 1 Hz band, 5 kHz band, or 10 kHz band.

The storage modulus can be controlled by changing the molecular weight or the type of bonding of a resin or the like, or by adding a filler, and in general, the storage modulus increases with an increase in molecular weight, an increase in bonding force, or addition of a filler. Further, for example, when a molded body is produced by blending a resin having a low storage modulus and a resin having a high storage modulus, the storage modulus of the molded body can be controlled by adjusting the blend ratio of these resins.

[Glass Transition Temperature]

It is preferable that a sheet has a glass transition temperature of 0° C. or less from the viewpoint of reducing the temperature dependence of the sound insulating performance at low temperatures. The lower the glass transition temperature of a sheet is, the higher the cold resistance is, and the temperature dependence of the modulus of elasticity around 0° C. tends to be smaller and the sound insulating performance tends to be less dependent on the environmental temperature. The temperature is more preferably −10° C. or less, still more preferably −20° C. or less, and particularly preferably −30° C. or less. Herein, the glass transition temperature of a sheet refers to the peak temperature of the loss tangent in dynamic viscoelasticity measurement at the above-described frequency of 10 kHz, in particular in temperature dependent measurement.

[Uneven Structure]

The sound insulating sheet member may include an uneven structure on at least one face of the sound insulating sheet member (hereinafter, also referred to as "sheet portion"), and the same uneven structure as in the second embodiment may be employed.

The sound insulating sheet member including a resonant portion, a base portion, a weight portion, a rib-shaped protrusion, and, the method of forming of the sound insulating sheet member including a resonant portion in the second embodiment may be employed in a similar manner.

EXAMPLES

The present invention will be described in further detail by way of Examples, but it is not limited to the following Examples unless the gist of the invention is exceeded. Various conditions and values of evaluation results in the following Examples indicate a preferred range of the present invention as well as a preferred range in the above-described embodiments of the present invention, and the preferred range of the present invention can be determined by taking into account a range indicated by the preferred range in the above-described embodiments and values in the following Examples or a combination of values among Examples.

In this section, a configuration composed of a sheet portion and/or a resonant portion is referred to as a sound insulating sheet member, and a configuration in which a support is layered thereon is referred to as a sound insulating structure body.

[Raw Materials to be Used]

The following materials were used as raw materials.

<Bifunctional Monomer (A)>

EBECRYL 8402 (manufactured by DAICEL-ALLNEX LTD., urethane acrylate, weight average molecular weight Mw: 1,000)

EBECRYL 230 (manufactured by DAICEL-ALLNEX LTD., urethane acrylate, weight average molecular weight Mw: 5000)

EBECRYL 270 (manufactured by DAICEL-ALLNEX LTD., urethane acrylate, weight average molecular weight Mw: 1500)

SHIKOH UV-3000B (manufactured by Mitsubishi Chemical Corporation, urethane acrylate, weight average molecular weight Mw18,000)

<Monofunctional Monomer (B)>

PHE-2D (phenoxydiethylene glycol acrylate manufactured by DKS Co. Ltd.)

ARONIX M-120 (manufactured by TOAGOSEI CO., LTD., special acrylate, molecular weight 245)

Viscoat #160 (manufactured by OSAKA ORGANIC CHEMICAL INDUSTRY LTD.), benzyl acrylate, molecular weight 162.2)

NK Ester AM-90G (SHIN-NAKAMURA CHEMICAL CO, LTD., methoxypolyethylene glycol #400 acrylate, molecular weight 454)

<Radical Polymerization Initiator (C)>

IRGACURE 184 (manufactured by BASF, 1-hydroxy-cyclohexyl-phenyl-ketone)

IRGACURE TPO (manufactured by BASF, 2,4,6-trimethylbenzoyl-diphenyl-phosphine oxide)

<Support>

PET film (Diafoil, manufactured by Mitsubishi Chemical Corporation, film thickness 250 μm)

[Evaluation of Sound Insulating Structure Body I]

Example 1

A mixture of a bifunctional monomer (A), a monofunctional monomer (B), and a radical polymerization initiator (C) shown in Table 1 was poured into an aluminum A4 size mold with concave shapes of 1.2 mm in diameter and 2 mm in height with a pitch of 2 mm, and then a PET film was placed on the mold, and a high-pressure mercury lamp was used, and curing was carried out by ultraviolet irradiation at a wavelength of from 200 to 450 nm and an energy amount of 1,000 mJ/cm$^2$. A sound insulating structure body cured in the mold was then released from the mold.

The obtained sound insulating structure body included convex-shaped resonant portions of 1.2 mm in diameter, 2 mm in height, and 2 mm in pitch, and the number of resonant portions per unit area was 2,500/100 cm$^2$. The weight of the sound insulating structure body was 71 g.

The areal density of the above-described PET film, which was a support, was 0.35 kg/m$^2$.

Example 2

A mixture of a bifunctional monomer (A), a monofunctional monomer (B), and a radical polymerization initiator (C) shown in Table 1 was prepared. The mixture was poured into an aluminum A4 size mold with concave shapes of 6 mm in diameter and 5 mm in height with a pitch of 10 mm, and then a PET film was placed on the mold, and a high-pressure mercury lamp was used, and curing was carried out by ultraviolet irradiation at a wavelength of from 200 to 450 nm and an energy amount of 1,000 mJ/cm$^2$. A sound insulating structure body cured in the mold was then released from the mold.

The obtained sound insulating structure body included convex-shaped resonant portions of 6 mm in diameter, 5 mm in height, and 10 mm in pitch, and the number of resonant portions per unit area was 100/100 cm$^2$. The weight of the sound insulating structure body was 119 g.

The areal density of the above-described PET film, which was a support, was 0.35 kg/m$^2$.

Example 3

A mixture of a bifunctional monomer (A), a monofunctional monomer (B), and a radical polymerization initiator (C) shown in Table 1 was prepared. The mixture was poured into an aluminum A4 size mold with concave shapes of 6 mm in diameter and 5 mm in height with a pitch of 18 mm, and then a PET film was placed on the mold, and a high-pressure mercury lamp was used, and curing was carried out by ultraviolet irradiation at a wavelength of from 200 to 450 nm and an energy amount of 1,000 mJ/cm$^2$. A sound insulating structure body cured in the mold was then released from the mold.

The obtained sound insulating structure body included convex-shaped resonant portions of 6 mm in diameter, 5 mm in height, and 18 mm in pitch, and the number of resonant portions per unit area was 30/100 cm$^2$. The weight of the sound insulating structure body was 119 g. The areal density of the above-described PET film, which was a support, was 0.35 kg/m$^2$.

Comparative Example 1

A mixture of a bifunctional monomer (A), a monofunctional monomer (B), and a radical polymerization initiator (C) shown in Table 1 was used to prepare a sound insulating structure body of Comparative Example 1 in the same manner as in Example 1. The specific gravity of a sound insulating sheet member was 1.1 g/cm$^3$, and the weight of the sound insulating structure body was 71 g. The areal density of a PET film, which was a support, was 0.35 kg/m$^2$.

Comparative Example 2

A mixture of a bifunctional monomer (A), a monofunctional monomer (B), and a radical polymerization initiator (C) shown in Table 1 was used, and this mixture was poured into an aluminum A4 size mold without concave shapes, and then a PET film was placed on the mold, and a high-pressure mercury lamp was used, and curing was carried out by ultraviolet irradiation at a wavelength of from 200 to 450 nm and an energy amount of 1,000 mJ/cm$^2$. A sound insulating structure body cured in the mold was then released from the mold.

The specific gravity of a sound insulating sheet member of the obtained sound insulating structure body was 1.1 g/cm$^3$ and the weight of the sound insulating structure body was 71 g. The areal density of the aluminum support was 1.35 kg/m$^2$.

Comparative Example 3

A mixture of a bifunctional monomer (A), a monofunctional monomer (B), and a radical polymerization initiator (C) shown in Table 1 was used to prepare a sound insulating structure body of Comparative Example 3 in the same manner as in Example 2. The specific gravity of the sound insulating sheet member was 1.1 g/cm$^3$ and the weight of the sound insulating structure body was 119 g. The areal density of a PET film, which was a support, was 0.35 kg/m$^2$.

Comparative Example 4

A sound insulating structure body was prepared in the same manner as in Example 1, except that the PET film support was changed to an iron support. The areal density of the iron support was 7.85 kg/m$^2$.

Reference Example 1

A sound insulating structure body was prepared in the same manner as in Example 1, except that the structure body does not include a convex-shaped resonant portion. The areal density of a PET film, which was a support, was 0.35 kg/m$^2$.

Reference Example 2

A sound insulating structure body was prepared in the same manner as in Example 3, except that the structure body does not include a convex-shaped resonant portion. The areal density of a PET film, which was a support, was 0.35 kg/m². [Storage Modulus]

The storage modulus was measured using a dynamic viscoelasticity device DMS6100 (manufactured by SII) under the following conditions. As a sample for measurement, a strip of a resin was prepared by pouring a mixture which was used for a sound insulating sheet member in the above-described Examples into a silicone frame of 5 mm wide, 50 mm long, and 1 mm thick, glass-casting the mixture, and irradiating the mixture with ultraviolet light at an energy of 1,000 mJ/cm² using a high-pressure mercury lamp. From obtained viscoelasticity curves, a composite curve was created from 1 Hz to 10 kHz based on the time-temperature conversion law, and the storage modulus was calculated at 25° C. The measurement results are shown in Table 1.

Measurement mode: Tensile
Measurement temperature: from −70 to 50° C.
Temperature rise speed: 2° C./min
Measurement frequencies: 1 Hz, 10 Hz, and 50 Hz (a composite curve from 1 Hz to 10 kHz was created from measurement results at these frequencies, and the storage modulus was calculated at 5 kHz and 10 kHz).

[Peak Temperature of Tan δ]

Using a dynamic viscoelasticity device DMS6100 (SII), tan δ was measured under the following conditions, and this peak temperature was determined. As a sample for measurement, a strip of a resin was prepared by pouring a mixture which was used for a sound insulating sheet member in the above-described Examples into a silicone frame of 5 mm wide, 50 mm long, and 1 mm thick, glass-casting the mixture, and irradiating the mixture with ultraviolet light at an energy of 1,000 mJ/cm² using a high-pressure mercury lamp. The measurement results are shown in Table 2.

Measurement mode: Tensile
Measurement temperature range: from −70 to 50° C.
Temperature rise speed: 2° C./min
Measurement frequency: 1 Hz

[Acoustic Transmission Loss]

The acoustic transmission loss was measured using the above-described sound insulating structure body. Using the measured values of Reference Example 1 and 2 as references, the difference between these measured values and corresponding Examples and Comparative Examples (ΔTL) was determined, and the results were summarized in Tables 1 and 2, where "A" was obtained if ΔTL in a range from 500 Hz to 5,000 Hz was 1.0 dB or more, and "B" was obtained if ΔTL was less than 1.0 or no peaks due to acoustic metamaterials appeared.

The measurement conditions for acoustic transmission loss is described below.

A white noise is generated from the inside of a small reverberation box to which a sound insulating structure body is attached, and the acoustic transmission loss (TL) can be determined from the difference in sound pressure between microphones installed inside and outside of the small reverberation box, based on the following Formula (1). Sound pressure difference between microphones installed inside and outside of a reverberation box $$TL\ [\text{dB}] = L_{in} - L_{out} - 3 \qquad (1)$$

$L_{in}$: Internal microphone sound pressure level [dB]
$L_{out}$: External microphone sound pressure level [dB]
Incident sound: White noise
Sample to Microphone Distance: 10 mm

TABLE 1

| | | Example 1 | Comparative Example 1 | Comparative Example 2 | Reference Example 1 | Example 2 | Comparative Example 3 | Comparative Example 4 | Example 3 | Reference Example 2 |
|---|---|---|---|---|---|---|---|---|---|---|
| Bifunctional monomer (A) | EBECRYL 8402 | — | 30 | — | — | — | 30 | — | — | — |
| | EBECRYL 230 | 50 | — | 50 | 50 | 50 | — | 50 | — | — |
| | SHIKOH UV-3000B | — | — | — | — | — | — | — | 20 | 20 |
| Monofunctional monomer (B) | ARONIX M-120 | 50 | — | 50 | 50 | 50 | — | 50 | — | — |
| | Viscoat #160 | — | 70 | — | — | — | 70 | — | — | — |
| | NK Ester AM-90G | — | — | — | — | — | — | — | 80 | 80 |
| Initiator | IRGACURE 184 | 1 | 1 | 1 | 1 | 1 | 1 | 1 | 1 | 1 |
| | IRGACURE TPO | 0.1 | 0.1 | 0.1 | 0.1 | 0.1 | 0.1 | 0.1 | 0.1 | 0.1 |
| Uneven structure | | With | With | With | Without | With | With | With | With | Without |
| Weight of sample (g) | | 71 | 71 | 71 | 71 | 119 | 119 | 71 | 119 | 119 |
| Storage modulus | DMS 1 Hz (MPa) | 2.9 | 37 | 2.9 | 2.9 | 2.9 | 37 | 2.9 | 2.9 | 2.9 |
| | DMS 5 kHz (MPa) | 58 | 3900 | 58 | 58 | 58 | 3900 | 58 | 32 | 32 |
| | DMS 10 kHz (MPa) | 88 | 4500 | 88 | 88 | 88 | 4500 | 88 | 53 | 53 |
| Acoustic transmission loss (ΔTL) | | A (ΔTL 1 dB) | B (ΔTL 0.3 dB) | B | Reference 1 | A (ΔTL 6 dB) | B | B | A (ΔTL 5 dB) | Reference 2 |
| Resonant portion | Pitch (mm) | 2 | 2 | 2 | None | 10 | 10 | 10 | 18 | None |
| | Diameter (mm) | 1.2 | 1.2 | 1.2 | None | 6 | 6 | 6 | 6 | None |
| | Height (mm) | 2 | 2 | 2 | None | 5 | 5 | 5 | 5 | None |
| Support | Material | PET | PET | Aluminum | PET | PET | PET | Iron | PET | PET |
| | Area density (kg/m²) | 0.35 | 0.35 | 1.35 | 0.35 | 0.35 | 0.35 | 7.85 | 0.35 | 0.35 |

TABLE 2

|  |  | Example 1 | Comperative Example 1 | Reference Example 1 | Example 2 | Comperative Example 3 | Example 3 | Reference Example 2 |
|---|---|---|---|---|---|---|---|---|
| Bifunctional monomer (A) | EBECRYL 8402 | — | 30 | — | — | 30 | — | — |
|  | EBECRYL 230 | 50 | — | 50 | 50 | — | — | — |
|  | SHIKOH UV-3000B | — | — | — | — | — | 20 | 20 |
| Monofunctional monomer (B) | ARONIX M-120 | 50 | — | 50 | 50 | — | — | — |
|  | Viscoat #160 | — | 70 | — | — | 70 | — | — |
|  | NK Ester AM-90G | — | — | — | — | — | 80 | 80 |
| Initiator | IRGACURE 184 | 1 | 1 | 1 | 1 | 1 | 1 | 1 |
|  | IRGACURE TPO | 0.1 | 0.1 | 0.1 | 0.1 | 0.1 | 0.1 | 0.1 |
| Uneven structure |  | With | With | Without | With | With | With | Without |
| Weight of sample (g) |  | 71 | 71 | 71 | 119 | 119 | 119 | 119 |
| Peak temperature of tan δ (° C.) |  | −51.8 | 22.2 | −51.8 | −51.8 | 22.2 | −50 | −50 |
| Acoustic transmission loss ΔTL |  | A | B | Reference 1 | A | B | A | Reference 2 |

From comparison between Example 1 and Comparative Example 1 in Table 1, it is found that a sound insulating structure body using a sound insulating sheet member with a desired storage modulus has superior sound insulating performance (large acoustic transmission loss) compared to a sound insulating structure body that does not have such a storage modulus. This is because the low modulus of elasticity even in a high frequency domain improves the acoustic transmission loss due to resonance of a resonant portion up to a region around 5 kHz.

From comparison between Example 1 and Reference Example 1, it is found that a sound insulating structure body with an uneven structure has superior sound insulating performance (large acoustic transmission loss) compared to a sound insulating structure body without such a structure. This is because an uneven structure acts as a resonant portion to improve the acoustic transmission loss.

From comparison between Example 1 and Comparative Example 1 in Table 2, it is found that a sound insulating structure body using a sound insulating sheet member with a peak temperature of a desired tan δ has superior sound insulating performance (large acoustic transmission loss) compared to a sound insulating structure body without such a member. This is because a low modulus of elasticity even in a high frequency domain improves the acoustic transmission loss due to resonance of a resonant portion up to a region around 5 kHz.

From comparison between Examples 1 and 2 and comparison between Comparative Examples 2 and 4 in Table 1, it is found that a sound insulating structure body using a support having a desired areal density has a superior sound insulating performance (large acoustic transmission loss) compared to a structure without such a density. This is because a desired areal density increases a vibration reduction effect of a support due to resonance of an uneven structure.

[Evaluation of Sound Insulating Structure Body II]

Reference Example 3

A mixture of a monomer A, a monomer B, and an initiator shown in Table 3 was poured into an aluminum A4 size mold with concave shapes of 1.2 mm in diameter and 2 mm in height with a pitch of 2 mm, and then a PET film was placed on the mold, and a high-pressure mercury lamp was used, and curing was carried out by ultraviolet irradiation at a wavelength of from 200 to 450 nm and an energy amount of 1,000 mJ/cm$^2$. A sound insulating structure body cured in the mold was then released from the mold.

The obtained sound insulating structure body included convex-shaped resonant portions of 1.2 mm in diameter, 2 mm in height, and 2 mm in pitch, and the number of resonant portions per unit area was 2,500/100 cm$^2$. The weight of the sound insulating sheet was 71 g.

Reference Example 4

A mixture of a monomer A, a monomer B, and an initiator shown in Table 3 was used to prepare a sound insulating structure body of Reference Example 4 in the same manner as in Reference Example 3. The specific gravity of a sound insulating sheet member was 1.1 g/cm$^3$. The weight of the sound insulating structure body was 71 g, and the number of resonant portions per unit area was 2,500/100 cm$^2$.

Reference Example 5

A mixture of a monomer A, a monomer B, and an initiator shown in Table 3 was used, and the mixture was cured in a container in the same manner as in Reference Example 3. Subsequently, a sound insulating structure body cured in the container was released from the container using the same method as in Reference Example 3, and a resonant portion in the sound insulating structure body was released from the structure body. The specific gravity of this member was 1.1 g/cm$^3$.

Reference Example 6

A mixture of a monomer A, a monomer B, and an initiator shown in Table 3 was used, and the mixture was cured in a container in the same manner as in Reference Example 3. Subsequently, a sound insulating structure body cured in the container was released from the container using the same method as in Reference Example 3, and a resonant portion in the sound insulating structure body was released from the structure body. The specific gravity of this member was 1.1 g/cm$^3$.

Reference Example 7

A mixture of a monomer A, a monomer B, and an initiator shown in Table 3 was used, and the mixture was cured in a container in the same manner as in Reference Example 3. Subsequently, a sound insulating structure body cured in the container was released from the container using the same method as in Reference Example 3, and a resonant portion in the sound insulating sheet member was released from the member. The specific gravity of this member was 1.1 g/cm$^3$.

[Tensile Elongation at Break]

From the mixture used for the sound insulating structure body in each of the above Reference Examples, a strip-shaped resin sample with a thickness of 200 μm, a width of 10 mm, and a length of 100 mm was prepared, and the tensile elongation at break of the strip-shaped resin sample was measured using a universal testing machine (manufactured by Shimadzu Corporation, Autograph AGS-X) to determine the tensile elongation at break of the sound insulating sheet member. The test conditions were set at a distance of 40 mm between chucks and a tensile speed of 5 mm/min, and the measurement was carried out at 25° C.

[Transferability]

In a process of removing a sound insulating structure body cured in a container from the container, the transferability was evaluated as "A" when a resonant portion was not released from a member or the resonant portion was not lost during the release, and as "B" when a resonant portion was released from a member or the resonant portion was lost during the release. The results of this evaluation are shown in Table 3.

TABLE 3

| | | Reference Example 3 | Reference Example 4 | Reference Example 5 | Reference Example 6 | Reference Example 7 |
|---|---|---|---|---|---|---|
| Bifunctional monomer (A) | EBECRYL 8402 | — | 30 | — | — | — |
| | EBECRYL 230 | 50 | — | 50 | — | — |
| | EBECRYL 270 | — | — | — | 50 | 50 |
| Monofunctional monomer (B) | PHE-2D | — | — | 30 | 50 | — |
| | ARONIX M-120 | 50 | — | — | — | 50 |
| | Viscoat #160NK | — | 70 | — | — | — |
| Initiator | IRGACURE 184 | 1 | 1 | 1 | 1 | 1 |
| | IRGACURE TPO | 0.1 | 0.1 | 0.1 | 0.1 | 0.1 |
| tensile elongation at break (%) | 5 mm/min, 25° C. | 187 | 148 | 39 | 33 | 25 |
| Transferability | | A | A | B | B | B |

From comparison between Reference Examples 3 and 4 and Reference Examples 5 to 7 in Table 3, it is found that a sound insulating structure body with high tensile elongation at break has excellent transferability. Accurate transfer of an uneven structure enables resonance in a target frequency domain.

REFERENCE SIGNS LIST

1 Sound insulating sheet member
2 Support
3 Rib-shaped protrusion
10 Sheet portion
11 Resonant portion
20 Base portion
21 Weight portion

What is claimed is:

1. A structural body, comprising:
a plurality of convex-shaped rubber-elastic resonant portions; and
a sheet-like support that supports the resonant portions,
wherein a specific gravity of the resonant portions is in a range of from 1.0 to 3.0 g/cm³,
wherein a height of the resonant portions is in a range of from 50 μm to 100 mm, and
wherein an areal density of the support is 1.0 kg/m² or less.

2. The structural body of claim 1, comprising a sheet member comprising the resonant portions and a rubber-elastic sheet portion on which the resonant portions are provided,
wherein the sheet member is layered on the support.

3. The structural body of claim 2, wherein the sheet member is integrally molded.

4. The structural body of claim 1, wherein the resonant portions have a storage modulus G' obtained from a composite curve of dynamic viscoelasticity according to ISO 6721-4 of 1 MPa or more at 25° C. and 10 KHz.

5. The structural body of claim 1, wherein the resonant portions have a peak temperature of tan δ obtained by dynamic viscoelasticity measurement according to ISO 6721-4 of 20° C. or less at 1 Hz.

6. The structural body of claim 1, wherein the resonant portions have a tensile elongation at break at a tensile speed of 5 mm/min of 30% or more in accordance with ISO 527.

7. The structural body of claim 1, wherein the resonant portions have a storage modulus G' obtained from a composite curve of dynamic viscoelasticity according to ISO 6721-4 of 80 MPa or less at 25° C. and 5 kHz.

8. The structural body of claim 1, wherein the resonant portions comprise a photo-curable resin.

9. The structural body of claim 1, wherein the specific gravity of the resonant portions is uniform.

10. The structural body of claim 2, wherein a height of the sheet member is in a range of from 50 μm to 10 mm.

11. The structural body of claim 1, wherein the resonant portions have a configuration of a single structure body.

12. The structural body of claim 1, wherein the resonant portions have a storage modulus G' obtained from a composite curve of dynamic viscoelasticity according to ISO 6721-4 of less than 4500 MPa at 25° C. and 10 KHz.

13. The structural body of claim 1, wherein the height of the resonant portions is in a range of from 100 μm to 50 mm.

14. The structural body of claim 1, wherein the height of the resonant portions is in a range of from 1 to 30 mm.

15. The structural body of claim 1, wherein the specific gravity of the resonant portions is in a range of from 1.01 to 2.5 g/cm³.

16. The structural body of claim 1, wherein the areal density of the support is in a range of from 0.01 to 0.9 kg/m².

17. The structural body of claim 1, wherein the areal density of the support is in a range of from 0.05 to 0.7 kg/m².

18. The structural body of claim 1, wherein the sheet-like support comprises a thermosetting resin.

19. The structural body of claim 1, wherein the sheet-like support comprises a saturated polyester resin, a polycarbonate resin, a polyamide resin, a polyolefin resin, a polyarylate resin, a polysulfone resin, and/or a polyphenylene ether resin.

20. The structural body of claim 1, wherein a difference between maximum and minimum specific gravities of the plurality of the resonant portions is within 0.5 g/cm$^3$.

* * * * *